(12) United States Patent
Loriant et al.

(10) Patent No.: US 12,211,302 B2
(45) Date of Patent: Jan. 28, 2025

(54) STRUCTURAL DECOMPOSITION IN HANDWRITING

(71) Applicant: MyScript, Nantes (FR)

(72) Inventors: Nicolas Loriant, Nantes (FR); Julien Vergne, Nantes (FR)

(73) Assignee: MYSCRIPT, Nantes (FR)

( * ) Notice: Subject to any disclaimer, the term of this patent is extended or adjusted under 35 U.S.C. 154(b) by 303 days.

(21) Appl. No.: 17/797,558

(22) PCT Filed: Feb. 2, 2021

(86) PCT No.: PCT/EP2021/052432
§ 371 (c)(1),
(2) Date: Aug. 4, 2022

(87) PCT Pub. No.: WO2021/156253
PCT Pub. Date: Aug. 12, 2021

(65) Prior Publication Data
US 2023/0054848 A1 Feb. 23, 2023

(30) Foreign Application Priority Data

Feb. 7, 2020 (EP) ..................................... 20305120

(51) Int. Cl.
G06F 40/166 (2020.01)
G06F 40/289 (2020.01)
G06V 30/32 (2022.01)

(52) U.S. Cl.
CPC ............ *G06V 30/36* (2022.01); *G06F 40/166* (2020.01); *G06F 40/289* (2020.01)

(58) Field of Classification Search
CPC ...... G06V 30/36; G06V 30/32; G06V 30/416; G06F 40/166; G06F 40/289

(Continued)

(56) References Cited

U.S. PATENT DOCUMENTS

2015/0149893 A1* 5/2015 Lukic ................... G06F 40/205
715/249

FOREIGN PATENT DOCUMENTS

| EP | 1519280 A2 | 3/2005 |
|----|-----------|--------|
| EP | 3200091 A1 | 8/2017 |

OTHER PUBLICATIONS

RO/EP: International Search Report mailed on Apr. 23, 2021 for corresponding International Application No. PCT/EP2021/052432; 3 pgs.

(Continued)

*Primary Examiner* — Stephen P Coleman

(74) *Attorney, Agent, or Firm* — McDermott Will & Emery LLP

(57) ABSTRACT

A method for processing lists in handwriting, comprising: initially classifying each of a plurality of text lines as a distinct text item which is not part of a list; and a classification process comprising a pattern detection in each text line for classifying each text line starting with a predetermined list symbol as a distinct list item which is part of a list; determining an item indentation of each text item with respect to a reference position and determining for each list item a text indentation representing the indentation of text comprised in said list item; and a merging step for merging, as part of a same text item, or as part of a same list item, if predefined conditions are met. A text structure data model may then be generated based on a result of the merging process.

15 Claims, 12 Drawing Sheets

(58) Field of Classification Search
USPC .......................................................... 382/181
See application file for complete search history.

(56) References Cited

OTHER PUBLICATIONS

RO/EP: Written Opinion mailed on Apr. 23, 2021 for corresponding International Application No. PCT/EP2021/052432; 5 pgs.
Wang, T. et al., "SmartList: Exploring Intelligent Hand-Written List Support." Proceedings of the 10th Int'l. Conference NZ Chapter of the ACM's Special Interest Group on Human-Computer Interaction, Chinz '09, ACM Press, New York, NY Jul. 6, 2009; pp. 61-64.

* cited by examiner

| TEXT LINES LN | VALUE i (ITEM/TEXT INDENTATION) | $t_0$ | $t_1$ | $t_2$ | | | | | |
|---|---|---|---|---|---|---|---|---|---|
| Etiam eget volutpat est, a elementum felis. (LN1) | 0 | T | T | | | | | | |
| Pellentesque ac auctor ipsum. Ut ac aliquet (LN2) | 0 | T | T | | | | | | |
| velit vehicula bibendum nec eu ligula Nam. (LN3) | 0 | T | T | | | | | | |
| Vivamus nec scelerisque mauris. Cras (LN4) | 0 | T | T | T | | | | | |
| facilisis sit amet sapien faucibus fringilla. (LN5) | 0 | T | T | | | | | | |
| Scelerisque, mauris ut cursus feugiat, (LN6) | 0 | T | T | | | | | | |
| mauris mauris elementum nisi, id interdum (LN7) | 0 | T | T | | | | | | |
| urna enim venenatis donec. (LN8) | 0 | T | T | | | | | | |
| 1. Vestibulum vitae volutpat nibh. In blandit (LN9) | 0 | D | D | D | | | | | |
| vulputate sem ut congue. Fusce finibus (LN10) | 1 | D | D | D | | | | | |
| varius efficitur. Integer venenatis lectus (LN11) | 1 | T | L | L | L | | | | |
| diam, a tincidunt massa auctor. (LN12) | 1 | T | T | T | L | | | | |
| • Fusce arcu nisi, tincidunti non (LN13) | 1 | T | L | L | L | L | | | |
| scelerisque ornare, ultricies eget velit. (LN14) | 1 | T | T | T | T | L | | | |
| 1.2.3.4.5 In pellentesque odio eu augue (LN15) | 0 | T | L | L | L | L | L | | |
| fermentum, a placerat nibh tincidunt. (LN16) | 1 | T | T | T | T | T | L | | |
| Quisque eros mauris, ultrices et est sit (LN17) | 1 | T | L | L | L | L | T | L | |
| amet, venenatis consectetur erat. (LN18) | 1 | T | T | T | T | T | T | L | |
| Curabitur ultricies ligula et tortor mattis (LN19) | 1 | T | T | T | T | T | T | T | |
| tincidunt. (LN20) | 1 | T | T | T | T | T | T | T | |
| Phasellus molestie mattis justo egestas (LN21) | 0 | T | T | T | T | T | T | T | T |
| posuere. Sed pulvinar neque sapien, quis (LN22) | 0 | T | T | T | T | T | T | T | T |
| finibus neque consequat dapibus erat, ac (LN23) | 0 | T | T | T | T | T | T | T | T |
| mollis dolor dapibus vel. (LN24) | 0 | T | T | T | T | T | T | T | T |

STRUCTURAL DECOMPOSITION IN HANDWRITING

CROSS-REFERENCE TO RELATED APPLICATIONS

This application is a U.S. National Phase application under 35 U.S.C. § 371 of International Application No. PCT/EP2021/052432, filed on Feb. 2, 2021; which claims the benefit of priority to European Application No. 20305120.6, filed Feb. 7, 2020; both of which are incorporated herein by reference in their entirety for all purposes.

TECHNICAL FIELD

The present disclosure relates generally to the field handwriting recognition and handwriting processing, and concerns in particular computing devices capable of recognising lists in handwriting.

BACKGROUND

Various computing devices have been developed over the years for handwriting input and recognition, i.e. input elements hand-drawn or handwritten by a user, such as text content (e.g., alphanumeric characters) or non-text content (e.g. shapes, drawings). To this end, known computing devices are usually equipped with a touch sensitive surface or the like to enable users to input handwriting content in the form of strokes of digital ink which may be displayed on a display screen.

The user handwriting input may be interpreted using an on-line handwriting recognition system which allows real-time recognition as handwriting is input by the user. Handwriting recognition may for instance be carried out using a cloud-based solution or the like. Alternatively, off-line systems are also known. Once recognised, the computing device may perform any appropriate processing task, such as converting the input strokes into a typeset version for instance or implementing editing functions.

To provide users with a good experience, including display of handwriting, manipulations (such as text reflow, etc.), editing and the like, it is critical that handwriting input from a user be recognised and that its structural decomposition (structural elements such as sentences, paragraphs, lists, etc.) be determined as accurately as possible.

Text classifiers are already known and used for recognising handwritten text, such as handwritten characters, digits, symbols, accents, etc. However, handwriting input may be of various natures, which sometimes renders the task of handwriting recognition delicate. The structural decomposition may also vary significantly in a text depending on each case. In handwritten documents, a reader may intuitively perceive the global structure of handwriting but it can be particularly challenging for a handwriting recognition system to identify a text structural decomposition. For instance, contrary to a word processor, a conventional handwriting recognition system cannot rely on special user instructions (e.g., line separators, paragraph separators, vertical and horizontal tab key) to detect lists in an handwritten text.

There is thus a need for an efficient and reliable solution for determining the text structural decomposition, i.e. the structural arrangement, of handwriting. In particular, there is a lack of efficient solutions for detecting paragraph in handwriting. There is also a lack of efficient solutions for detecting lists in handwriting. In particular, a solution to discriminate list and non-list elements in handwriting in an accurate and reliable manner is needed, for instance to improve manipulations or editing on handwriting.

SUMMARY OF THE INVENTION

The examples of the present invention that are described herein below provide computing devices, methods and corresponding computer programs for processing lists in handwriting.

According to a particular aspect, the invention provides a method implemented by a computing device for processing lists in handwriting, comprising:
  recognising text by performing text handwriting recognition on a plurality of strokes of digital ink in an electronic document, said text comprising a plurality of successive text lines;
  initially classifying each recognised text line as a distinct text item which is not part of a list;
  a classification process comprising the following steps:
    a) pattern detection in each text line for determining whether said text line starts by a predetermined list symbol indicating that said text line is part of a list, and classifying each text line starting with a predetermined list symbol as a distinct list item which is part of a list;
    b) in response to the step a), determining an item indentation of each text item with respect to a reference position and determining for each list item a text indentation representing the indentation of text comprised in said list item with respect to the reference position;
    c) in response to the step b), a merging process comprising:
      merging, as part of a same text item, each pair of consecutive text lines, in said text, formed by a first text line followed by a second text line if the first and second text lines of said pair are text items with a same item indentation and if there is not enough free space at the end of the first text line to accommodate a first word starting the second text line; and
      merging, as part of a same list item, each pair of consecutive text lines formed by a first text line followed by a second text line if the first text line is a list item and the second text line is a text item with an item indentation matching the text indentation of the first text line and if there is not enough free space in the end of the first text line to accommodate a first word starting the second text line;
  generating, based on a result of the merging process, a text structure data model defining each text line as part of either a text item or a list item.

The invention provides for an efficient and reliable solution for determining the text structural decomposition, i.e. the structural arrangement, of handwriting. Thanks to the invention, list items in handwriting can be detected. In particular, the invention allows discriminating (or distinguishing) list and non-list elements in handwriting in an accurate and reliable manner, for instance to improve manipulations or editing on handwriting.

Paragraphs in handwriting may also be detected.

In a particular embodiment, the method comprises: acquiring and displaying a plurality of strokes of digital ink as user input;

wherein said recognising comprising performing the text handwriting recognition on the acquired strokes and identifying the plurality of successive text lines from the recognised text.

In a particular embodiment, said pattern detection comprises, for each text line, comparing a first symbol starting said text line with a set of predetermined list symbols to determine whether there is match.

In a particular embodiment, the predetermined list symbol is a number or a bullet.

In a particular embodiment, the position reference is a predetermined position within the electronic document.

In a particular embodiment, the merging process comprises maintaining as separate items each pair of consecutive text lines formed by a first text line followed by a second text line if the first text line is a text item and the second text line is a list item.

In a particular embodiment, the text structure data model decomposes the recognised text into at least one text item and/or at least one list item, each item being associated with at least one text line and with each stroke belonging to said at least one text line.

In a particular embodiment, the method comprises an editing of the recognised text based on the text structure data model, in response to user instructions, said editing comprises at least one of:
- modifying the content of at least one item of the recognised text; and
- a reflow process causing reflow of the digital ink of at least one item of the recognised text
- wherein the computing device uses information of the text structure data model to control said editing.

In a particular embodiment, during a reflow process, a text or list item which has been previously separated from an immediately preceding item in response to a user splitting command is merged into said immediately preceding item only in response to a user join command to join the two items together.

In a particular embodiment, the method comprises:
- displaying the recognised text;
- after said generating the text structure data model, acquiring user instructions causing alterations to the recognised text being displayed; and
- an update process wherein the text structure data model is updated to reflect the alterations caused by the user instructions.

In a particular embodiment, the alterations caused by the user instructions comprise adding at least one new stroke into the electronic document and/or removing or modifying at least one existing stroke,
- wherein the update process comprises updating the text structure data model by deleting any removed stroke from the text structure data model and by allocating any new stroke to an existing or new item, either text or list item, of the text structure data model.

In a particular embodiment, said generating the text structure data model comprises defining:
- for each text item, a begin zone which starts at the first visible character in said text item and extends forwards to enclose one or more complete words until a predefined number of consecutive visible characters is reached or less if said beginning zone reaches the end of said text item; and
- for each list item, a bullet zone which starts at the associated predefined list symbol and extends forwards to enclose one or more complete words until a predefined number of consecutive visible characters is reached or less if said bullet zone reaches the end of said list item;
- wherein the update process comprises:
- determining for each item whether the alterations caused by the user instructions modify its begin zone or bullet zone and/or whether at least one character is added before said begin zone or bullet zone and, in the affirmative, updating said begin zone or bullet zone based on the alterations and repeating said steps a), b) and c) based on said updated begin zone or bullet zone to update the text structure data model.

In a particular embodiment, the update process comprises:
- detecting at least one stroke added within a text line of a text or list item in response to said user instructions;
- determining whether said text line starts by a predetermined list symbol indicating that said text line is part of a list; and
- in the affirmative, splitting the corresponding text item or list item to create a new list item and updating the text structure data model to reflect said splitting.

In a particular embodiment, said generating the text structure data model comprises defining:
- for each text item and each list item, a respective begin zone which starts at the first visible character in each text line of said item past its first line and extends forwards to enclose one or more complete words until a predefined number of consecutive visible characters is reached or less if said begin zone reaches the end of said text line; and
- wherein the update process comprises:
- checking, for each text item and each list item, each text line past its first text line for any new stroke added within the begin zone or before the begin zone of said text line in response to said user instructions;
- for each positively checked text line, determining whether said text line starts by a predetermined list symbol indicating that said text line is part of a list; and
- in the affirmative, splitting the corresponding text item or list item to create a new list item starting with the predetermined list symbol and updating the text structure data model to reflect said splitting.

In a particular embodiment, said generating the text structure data model comprises defining, for each text and list item, an end zone which extends backwards from the last visible character of said item by enclosing one or more completes words until a predefined number of consecutive visible characters is reached or less if said end zone reaches the beginning of said item;
- wherein the update process comprises:
- determining for each item whether the alterations caused by the user instructions modify its end zone and/or whether at least one stroke is added after the end zone and, in the affirmative, updating said end zone based on the alterations and repeating said step c) based on said updated end zone to update the text structure data model.

In a particular embodiment, in response to a split command received as user instructions for splitting an existing item into two distinct items:
- if the split command specifies a splitting location at the start or end of a text line, an empty line is inserted at said splitting location; and
- if the split command specifies a splitting location within a text line, the update process comprises:
- splitting said text line at the splitting location into a first text line and a second text line belonging respectively to a first item and a second item obtained from splitting said existing item;

determining whether the second text line starts by a predetermined list symbol indicating that said second text line is part of a list; and in the affirmative, classifying the second item as a list item, otherwise classifying the second item as a text item.

In a particular embodiment, two consecutive items are merged into a same item only in response to a user instruction to join two distinct items together.

According to another aspect, the present inventions relates to a non-transitory computer readable medium having recorded thereon a computer readable program code (or computer program) including instructions for executing the steps of the method of the invention as defined in the present document.

The computer program of the invention can be expressed in any programming language, and can be in the form of source code, object code, or any intermediary code between source code and object code, such that in a partially-compiled form, for instance, or in any other appropriate form.

The invention also provides a computer program as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the invention can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

In a particular embodiment, the invention relates to a non-transitory computer readable medium having a computer readable program code embodied therein, said computer readable program code being adapted to be executed to implement a method on a computing device as defined in the present document, the computing device comprising a processor for executing the steps of said method.

The present invention also relates to a computing device suitable to implement the method as defined in the present disclosure. More particularly, the present invention provides a computing device for processing lists in handwriting, comprising:

a recognition module configured to recognise text by performing text handwriting recognition on a plurality of strokes of digital ink in an electronic document, said text comprising a plurality of successive text lines which can each be either a list item which is part of a list or a text item which is not part of a list;

a classifier module configured to initially classify each recognised text line as a distinct text item and to perform a classification process comprising the following steps:

a) pattern detection in each text line for determining whether said text line starts by a predetermined list symbol indicating that said text line is part of a list, and classifying each text line starting with a predetermined list symbol as a list item;

b) in response to the step a), determining an item indentation of each text item with respect to a reference position and determining for each list item a text indentation representing the indentation of text comprised in said list item with respect to the reference position;

c) in response to the step b), a merging process comprising:

merging, as part of a same text item, each pair of consecutive text lines, in said text, formed by a first text line followed by a second text line if the first and second text lines of said pair are text items with a same item indentation and if there is not enough free space in the end of the first text line to accommodate a first word starting the second text line; and merging, as part of a same list item, each pair of consecutive text lines formed by a first text line followed by a second text line if the first text line is a list item and the second text line is a text item with an item indentation matching the text indentation of the first text line and if there is not enough free space in the end of the first text line to accommodate a first word starting the second text line;

a model management module configured to generate, based on a result of the merging process, a text structure data model defining each text line as part of either a text item or a list item.

The various embodiments defined above in connection with the method of the present invention apply in an analogous manner to the computing device, the computer program and the non-transitory computer readable medium of the present disclosure.

For each step of the method of the present invention as defined in the present disclosure, the computing device may comprise a corresponding module configured to perform said step.

In a particular embodiment, the disclosure may be implemented using software and/or hardware components. In this context, the term "module" can refer in this disclosure to a software component, as well as a hardware component or a plurality of software and/or hardware components.

BRIEF DESCRIPTION OF THE DRAWINGS

Other characteristics and advantages of the present disclosure will appear from the following description made with reference to the accompanying drawings which show embodiments having no limiting character. In the figures:

FIGS. 6, 7 and 8 represent handwriting input at different steps of a method according to particular embodiments of the invention;

FIG. 9 is a table representing the results obtained at different steps of a method according to a particular embodiment of the invention;

Figure 1:
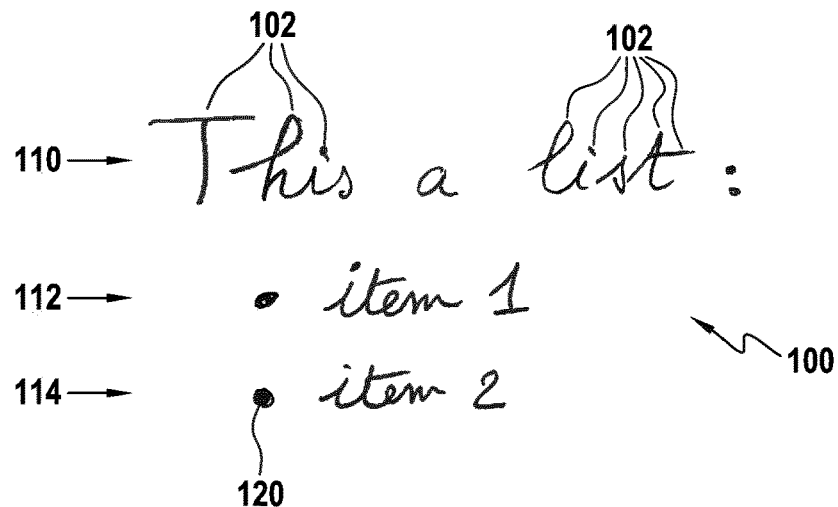
FIG. 1 shows an example of handwritten text comprising list and non-list content.

The components in the figures are not necessarily to scale, emphasis instead being placed upon illustrating the principles of the present invention.

For simplicity and clarity of illustration, the same reference signs will be used throughout the figures to refer to the same or analogous parts, unless indicated otherwise.

DESCRIPTION OF PARTICULAR
EMBODIMENTS OF THE INVENTION

In the following detailed description, numerous specific details are set forth by way of examples in order to provide a thorough understanding of the relevant teachings. However, it should be apparent to those skilled in the art that the present teachings may be practiced without such details. In other instances, well known method, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a computing device, a corresponding method and a corresponding computer program are discussed.

The terms "hand-drawing" and "handwriting" are used interchangeably herein to define the creating of digital contents (handwriting input) by users through use of their hands (or fingers) or an input device (hand-held stylus or digital pen, mouse . . . ) on or with an input surface. The term "hand" or the like is used herein to provide concise description of the input techniques, however the use of other parts of a user's body for similar input is included in this definition, such as foot, mouth and eye.

Handwriting is formed by strokes of digital ink input by a user. A stroke (also called ink stroke or ink segment) is characterised by at least a stroke initiation location (corresponding to a "pen down" event), a stroke terminal location (corresponding to a "pen up" event), and the path connecting the stroke initiation and the stroke terminal locations.

A stroke segment is a portion of a stroke. An ink selection is the union of at least two distinct (non-overlapping) ink strokes or ink segments. Ink selections can be compared for equality, intersection and so on.

The term "text" in the present disclosure is understood as encompassing all characters and the like (e.g. alphanumeric characters), and strings thereof, in any written language and, more generally, any symbols used in written text. Text thus includes for instance base characters and accents from any script, such as Latin scripts, Cyrillic scripts, Chinese scripts, and so on. Text may comprise one or a plurality of such symbols, and may be arranged in various manner such as in text lines, paragraph of multiple text lines, etc.

The term "list" is understood in the present disclosure as encompassing any set (or sequence) of one or a plurality of list items arranged as a list. Each list item comprises text and is introduced by a special typographical symbol (or glyph)— called list symbol—which can be or comprise a bullet (or bullet point), a character, a number (or digit). A bullet symbol may take any of a variety of shapes, such as circular, square, diamond or arrow. Such regular symbols such as "*" (asterisk), "-" (hyphen), "." and the like can be used as bullet. In the following description, these special typographical symbols are generally referred to as "list symbols". A list symbol may comprise one or a combination of any one of the above-mentioned bullets, characters, numbers, etc. A list may be an ordered list (the list symbols includes numbers ordering the list items) or a non-ordered list (the list symbols do not defined any order among the list items).

In the present disclosure, a list item thus refers to an item of a list while a text item refers to a non-list item, i.e. an item of text which is not part of a list. A list item and a text item may each comprise one or a plurality of text lines. A text item comprising a plurality of text lines may be regarded as forming a paragraph.

Furthermore, the examples described below and shown in the drawings are in a left-to-right written language context, and therefore any reference to positions can be adapted for written languages having different directional formats.

FIG. 1 depicts an example of handwriting 100 comprising text arranged in 3 text lines 110, 112 and 114. The handwriting input 100 is formed by strokes 102 of digital ink forming characters. Each stroke 102 may form a full character, part of a character, or a plurality of characters. For instance the point at the top of the character "i" constitutes a stroke on its own. In the present case, the following text is formed by the strokes 102: "This is a list:" (text line 110), "• item 1" (text line 112) and "• item 2" (text line 114). The first text line 110 constitutes a text item (i.e. non-list item) while the text lines 112 and 114 constitute list items introduced by the list symbol 120 "•" (a circular bullet point in this case).

The various technologies described herein generally relate to processing handwritten on portable and non-portable computing devices, more particularly for the purpose of recognising and editing math and text. Whilst the various embodiments described below involves recognition of digital ink handwriting input using so-called online recognition techniques, it is understood that other forms of input for recognition may be applied, such as offline recognition involving a remote device or server to perform recognition.

The systems and methods described herein may utilise recognition of user's natural handwriting styles input to a computing device via an input surface, such as a touch sensitive screen (as discussed later).

As described in more details below, an aspect of the present invention concerns determining the text structure decomposition of handwriting and, in particular, relates to detecting and processing list content and non-list content in handwriting. The method involves in particular a pattern detection process to detect list symbols in handwriting input and merging process to merge certain text lines together as a function of how text lines are arranged relative to each other.

More particularly, the invention relates to a method implemented by a computing device for processing list and non-list content, the method comprising: a text handwriting recognition on a plurality of strokes of digital ink forming text lines; initially classifying each recognised text line as a distinct text item which is not part of a list; and a classification process for classifying each text line as either list item or text (non-list) item. As described further below, the classification process may comprise a pattern detection to detect each text line starting with a predetermined list symbol (a bullet, digit or the like) and classifying each detected text line as a distinct list item which part of a list; determining an item indentation of each text item and a text indentation representing the indentation of text for each list item; and a merging step comprising merging each pair of consecutive text lines which meet a predetermined condition (as described further below). The computing device may also generate, based on a result of the merging process, a text structure data model defining each text line as part of either a text item or a list item.

As illustrated in particular examples below, the text structure data model defines the structural decomposition of the handwritten text formed by the text lines.

Figure 2:
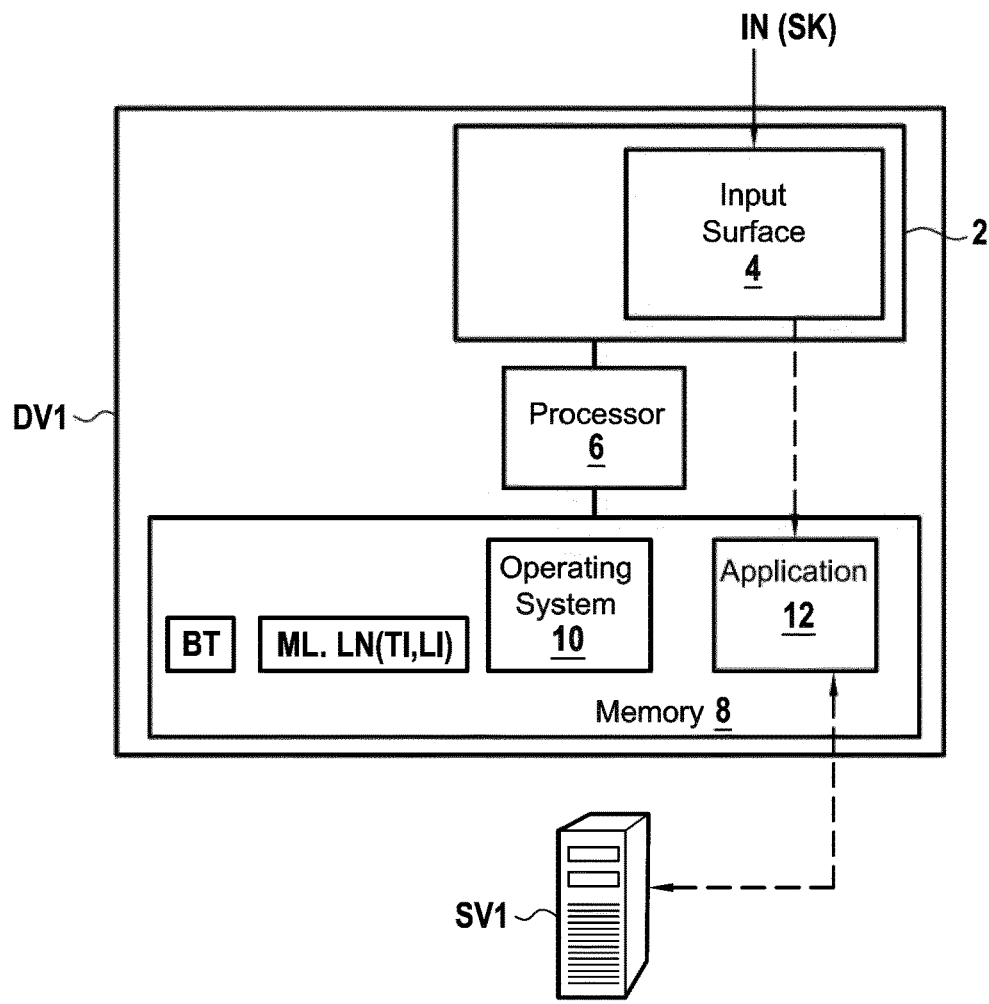
FIG. 2 is a block diagram of a computing device according to a particular embodiment of the invention.

FIG. 2 shows a block diagram of a computing device DV1 according to a particular embodiment of the present invention. The computing device (or digital device) DV1 may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device DV1 may include components of at least one processing elements, some form of memory and input and output (I/O) devices. The components communicate with each other through inputs and outputs, such as connectors, lines, buses, links networks, or others known to the skilled person.

More specifically, the computing device DV1 comprises an input surface 4 for handwriting (or hand-drawing) text IN, which may comprise text items and/or list items as described further below. The input surface 4 is suitable to detect a plurality of strokes SK of digital ink entered on (or using) said input surface.

The input surface 4 may employ any appropriate technology such as resistive, surface acoustic wave, capacitive, infrared grid, infrared acrylic projection, optical imaging, dispersive signal technology, acoustic pulse recognition, or any other appropriate technology as known to the skilled person to receive user input in the form of a touch- or proximity-sensitive surface. The input surface 4 may be a non-touch sensitive surface which is monitored by a position detection system.

The computing device 100 also comprises at least one display unit (or display device) 2 for outputting data from the computing device DV1 such as handwriting IN. The display unit 2 may be a screen or the like of any appropriate technology (LCD, plasma . . . ). The display unit 2 is suitable to display strokes SK of digital ink input by a user.

The input surface 4 may be co-located with the display unit 2 or remotely connected thereto. In a particular example, the display unit 2 and the input surface 4 are parts of a touchscreen.

As depicted in FIG. 2, the computing device DV1 further comprises a processor 6 and a memory 8. The computing device DV1 may also comprise one or more volatile storing elements (RAM) as part of the memory 8 or separate thereof.

The processor 6 is a hardware device for executing software, particularly software stored in the memory 8. The processor 8 can be any custom made or general purpose processor, a central processing unit (CPU), a semiconductor based microprocessor (in the form of microchip or chipset), a microcontroller, a digital signal processor (DSP), an application specific integrated circuit (ASIC), field programmable gate array (FPGA) or other programmable logic device, or any combination thereof, and more generally any appropriate processor component designed for executing software instructions as known to the skilled person.

The memory 8 is a non-transitory (or non-volatile) computer readable medium (or recording medium) in accordance with a particular embodiment of the disclosure. The memory 8 may include any combination of non-volatile storing elements (e.g. ROM, EPROM, flash PROM, EEPROM, hard drive, magnetic or optical tape, memory registers, CD-ROM, WORM, DVD, or the like).

The memory 8 may be remote from the computing device DV1, such as at a server or cloud-based system, which is remotely accessible by the computing device DV1. The non-volatile memory 8 is coupled to the processor 6, so that the processor 6 is capable of reading information from and writing information to the memory 8. As an alternative, the memory 8 is integral to the computing device 8.

The memory 8 includes an operating system (OS) 10 and a handwriting application (or computer program) 12. The operating system 10 controls the execution of the application 12. This application constitutes (or comprises) a computer program (or computer-readable program code) according to a particular embodiment of the invention, this computer program comprising instructions to implement a method according to a particular embodiment of the invention.

In the present embodiment, the application 12 includes instructions for processing handwriting IN which is acquired in appropriate manner. In the present example, handwriting IN which is to is processed may be strokes SK of digital ink handwritten by a user using the input surface 4 of the computing device 100, as discussed further below. In a variant, the handwriting IN at hand is acquired by the computing device DV1 but is not input through the input surface 4.

As depicted in FIG. 2, the non-volatile memory 8 is suitable to store various data acquired by the computing device 2, including a set of predefined list symbols BT and a text structure data model (also called model) ML. The set may comprise one or a plurality of predefined list symbols BT characterising the start of list items. The text structure data model ML comprises information defining the structure of handwriting, such as for instance the type of text lines which may be either list items LI or text (i.e. non-list) items TI. The nature and use of these features will be described in more details hereafter.

Figure 3:
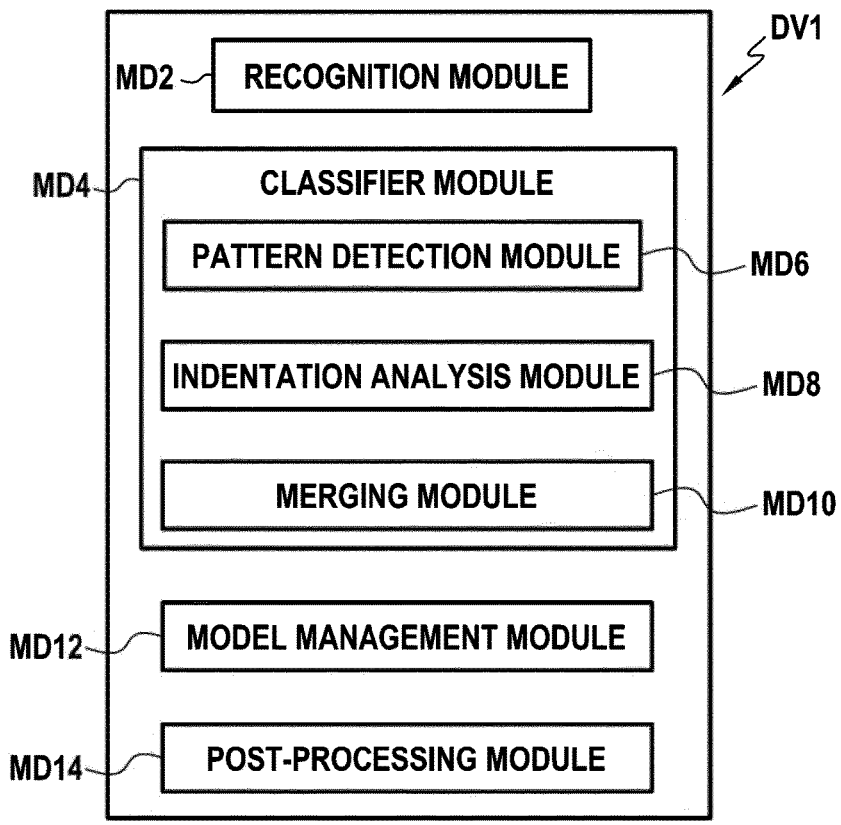
FIG. 3 is a block diagram representing modules implemented by a computing device according to a particular embodiment of the invention.

As shown in FIG. 3 according to a particular embodiment, when running the application 12 stored in the memory 108 (FIG. 2), the processor 6 may implement modules, namely: a recognition module MD2, a classifier module MD4, a model management module 12 and, in some embodiments, a post-processing module MD14.

The recognition module MD2 may be configured to recognise text by performing text handwriting recognition on a plurality of strokes SK of digital ink in an electronic document, said text comprising a plurality of successive text lines LN.

The classifier module MD4 may be configured to initially classify each recognised text line LN as a distinct text item TI and to perform a classification process comprising:

a) pattern detection in each text line LN for determining whether said text line LN starts by a predetermined list symbol BT indicating that said text line LN is part of a list, and classifying each text line LN starting with a predetermined list symbol as a distinct list item which is part of a list;

b) determining an item indentation of each text item TI with respect to a reference position and determining for each list item LI a text indentation representing the indentation of text comprised in said list item LI with respect to the reference position;

c) a merging step comprising:
   merging, as part of a same text item TI, each pair of consecutive text lines LN formed by a first text line LN followed by a second text line LN if the first and second text lines of said pair are text items with a same item indentation and if there is not enough free space in the end of the first text line to accommodate a first word starting the second text line; and
   merging, as part of a same list item LI, each pair of consecutive text lines LN formed by a first text line LN followed by a second text line LN if the first text line is a list item and the second text line is a text item with an item indentation matching the text indentation of the first text line and if there is not enough free space in the end of the first text line to accommodate a first word starting the second text line.

In the present example, the classifier module MD4 comprises a pattern detection module MD6 configured to perform the step a), a determination module MD8 to perform the step b) and a merging module MD10 to perform the step c).

The model management module MD12 may be configured to generate, based on a result of the merging step, a text structure data model ML defining each text line LN as part of either a text item or a list item.

The post-processing module MD14 may be configured to perform an editing of the text recognised by the recognition module MD2, based on the text structure data model, said editing comprises at least one of: modifying the content of at least one item of the recognised text; and a reflow process causing reflow of the digital ink of at least one item of the recognised text. The post-processing module MD14 may perform such an editing of the recognised text in response to user instructions.

The application 12 comprises instructions configuring the processor 6 to implement the above-mentioned modules MD2-MD14 in order to perform steps of a method of the invention, as described later in particular embodiments.

The configuration and operation of the modules MD2-MD14 of the computing device DV1 will be more apparent in the particular embodiments described hereinbelow with reference to the figures. It is to be understood that the modules MD2-MD14 as shown in FIG. 3 represent only an example embodiment of the present invention, other implementations being possible.

For each step of the method of the present invention, the computing device DV1 may comprise a corresponding module configured to perform said step.

As described further below in particular embodiments, the method of the present invention may involve determining indentation of text lines LN of handwritten text IN. An indentation (or indent) defines the lateral position at which starts a given text line in a document. An indentation may be formed by an empty space preceding a text line LN. In many written language, a first-line indentation for instance indents the first line of a paragraph.

Figure 4:
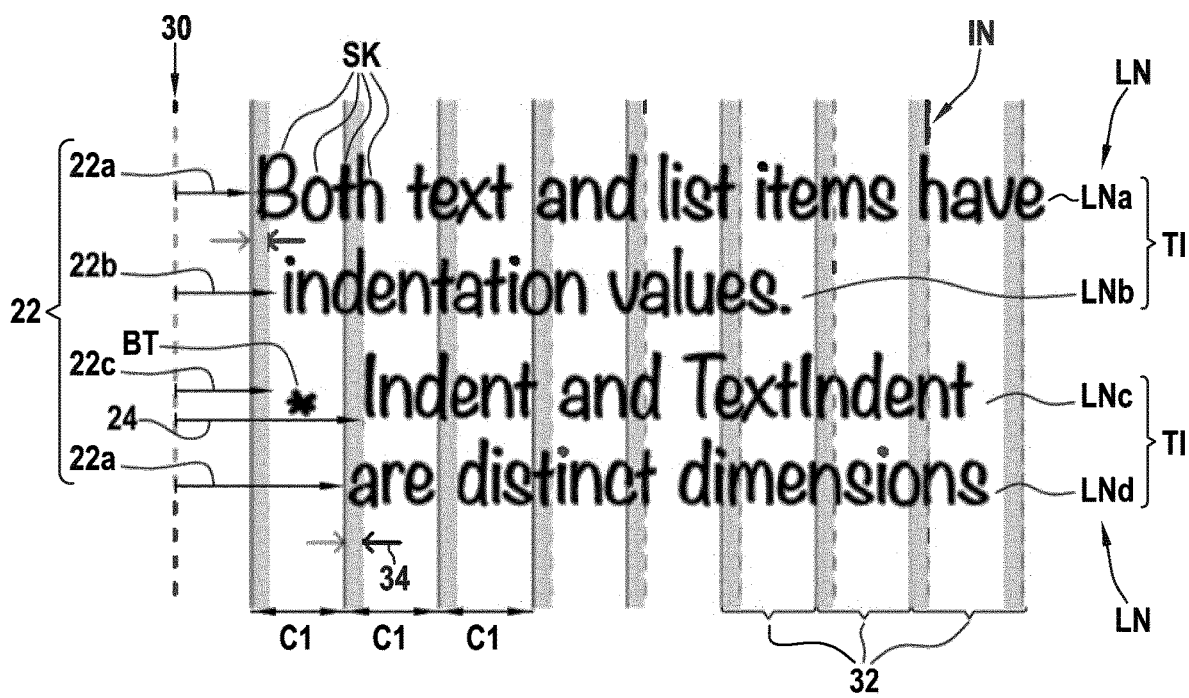
FIG. 4 depicts determination of indentations in an handwritten text according to a particular embodiment of the present invention.

The FIG. 4 depicts an example where handwritten text IN (represented in typeset style for a matter of convenience) is formed by digital ink strokes SK in an electronic document. The handwritten text IN comprises 4 text lines LNa, LNb, LNc and LNd (designated collectively as LN) each comprising text. In the present example, indentation is determined with respect to a (lateral) reference position 30 in the document.

The indentation 22a, 22b, 22c and 22d (designated collectively as 22) constitute the indentation of the respective text lines LNa, LNb, LNc and LNd and are referred to as "item indentations". In other words, an item indentation is the indentation of an item (a list item or text item) with respect to a reference position 30.

The text lines LNa and LNb may be detected by the computing device DV1 as part of a same text item TI since they have the same (or substantially the same) item indentations 22a, 22b. On the other hand, the text lines LNc and LNd may be detected by the computing device DV1 as part of a same list item LI since the text line LNc starts with a predefined list symbol BT "*" and since the text lines LNc, LNd have the same (or substantially the same) item indentations 22c, 22d.

Various ways of computing indentations may be contemplated. In the present example, both text and list items have a respective indentation value—noted "i"—representative of their lateral position relative to the left margin 30. In the present example, the computing device DV1 performs a column-based calculation to determine a value i representative of the indentation of each item based on a number of predefined columns Cl separating the start of the given item from the reference position 30. The indentation value i may be computed by determining the first column border to the left of the word for a text item or of the list symbol for a list item. The size of these columns Cl may be proportional to the text line height and may both be customizable. In other words, the width (or size) C of these columns Cl may be selected to be proportional to the height of the text lines LN.

In the example shown in FIG. 4, the columns designated by the arrows 34 indicate the tolerance zone for the indentation calculation. The item indentation 22 of the text lines LNa and LNb has the value of 1, while the item indentation 22 of the text lines LNc and LNd has the value of 2.

An item indentation 22 may be computed for the entire text item TI formed by the text lines 22a and 22b (e.g. value of 1). Similarly, an item indentation 22 may be computed for the entire list item LI formed by the text lines 22c and 22d (e.g. value of 2).

In a particular example, the indentation i is calculated such that:

$$i = \text{floor}\left(\frac{\Delta + tC}{C}\right)$$

where $\Delta$ is the distance of an item from the reference position 30, C is the width of the predefined columns Cl and t is tolerance defined as a percentage (%) of the width C.

As shown in FIG. 4, the text line LNc which starts with a list symbol BT "*" and is thus part of an list item IT is also characterised by a text indentation 24 representative of the indentation of the text comprised in the text line LNc relative to the reference position 30. In other words, each list item starting with a predefined list symbol BT is characterised by an item indentation 22 and by a text indentation 24, the latter being defined by the lateral position of the first character of the list item relative to a reference position 30.

In the present example, the indentation value i is not a distance from the margin but an incremental value based on a fixed width column Cl. Other implementations to determine the item indentations of text items and to determine text indentations of list items may be contemplated. As explained further below, the indentation value i is used to determine the scope of lists and sublists.

A method implemented by the computing device DV1 illustrated in FIGS. 2-3 is now described with reference to FIGS. 5-15, in accordance with particular embodiments of the present invention. More specifically, the computing device DV1 implements this method by executing the application 12 stored in the memory 8.

An example scenario is considered where the computing device DV1 acquires handwriting IN (handwritten text) and implements the handwriting recognition application 12 to determine a text structure data model ML of the acquired handwriting IN and, more particularly, to recognise list items LI and text items TI in said handwriting IN.

More specifically, in an acquisition step S2 (FIG. 5), the computing device DV1 acquires handwriting IN in the form of digital ink. The acquired handwriting input IN is formed by a plurality of strokes SK of digital ink. These strokes SK constitute a digital representation of the handwriting IN. It is considered that the acquired set of strokes SK form a plurality of text lines LN extending substantially along a same orientation in an electronic document 40. These successive text line LN may be arranged in various ways depending on each case.

Each text line LN is formed by one or a plurality of strokes SK, which form one or a plurality of characters (or symbols) CH, the latter forming one or a plurality of words WD.

In a particular example, text in the text lines can mix both handwriting and typesetted (or typeset) text, where in the typesetted text, each glyph is considered as a stroke.

For the sake of illustration, handwriting in a fake (fictive) language is used instead of handwriting in an actual language. The present invention allows determining the text structure of any handwritten text, including in fake languages.

Figure 6:
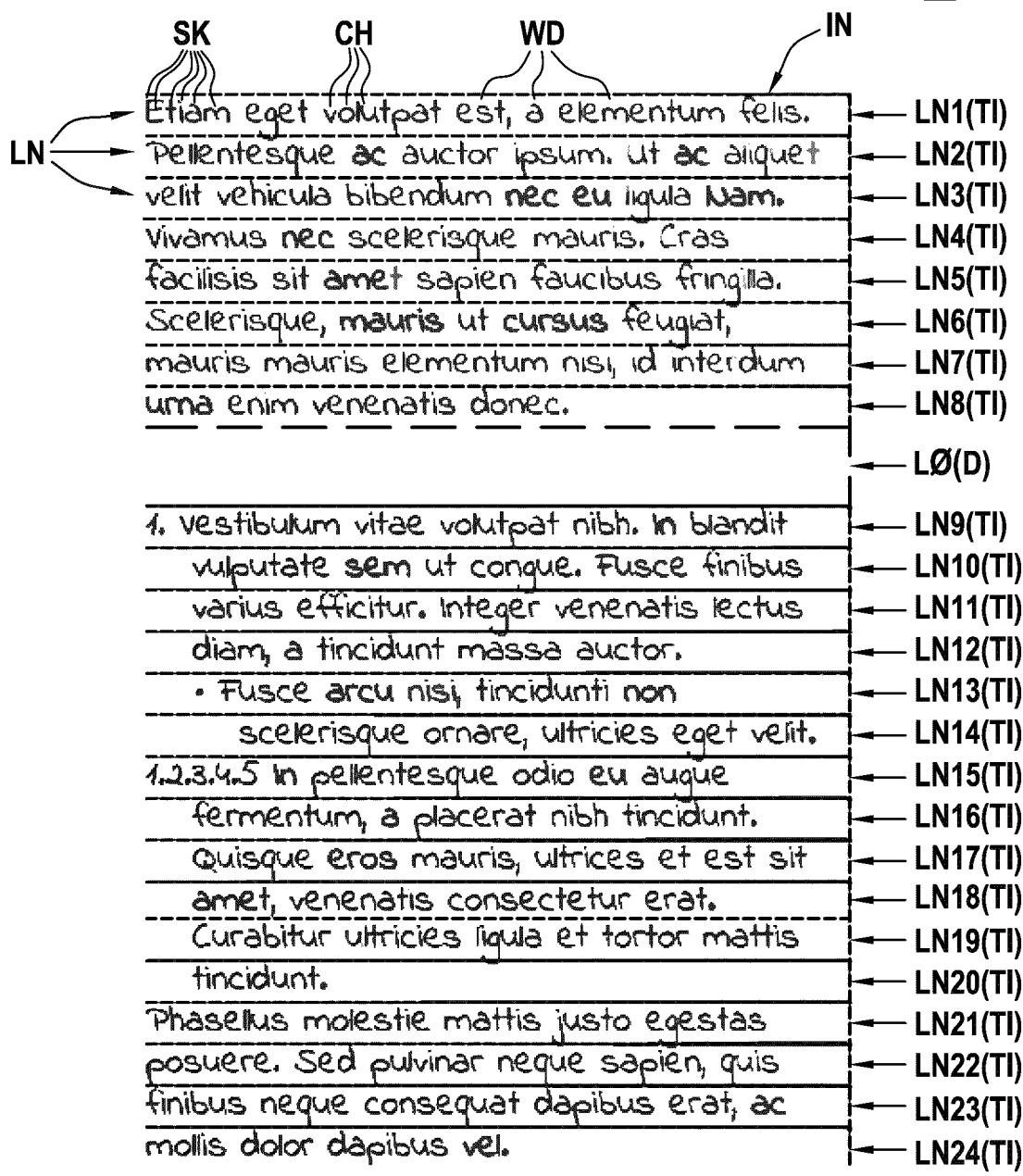

Contours are merely shown in FIG. 6 to mark item boundaries between each text line LN. In the present example, the handwriting input IN form 22 successive text lines LN1 through LN24 designated collectively as LN. Each text line LN comprises text, i.e. a plurality strokes forming multiple characters CH forming words WD. In this example, the handwriting input also comprises two consecutive empty lines L0 (between text lines LN8 and LN9) which do not contain any text. The handwriting input IN shown in FIG. 6 is of course provided as a mere example to illustrate the concept of the invention in a particular embodiment.

The computing device DV1 thus displays (S2) the acquired strokes ST on the display 2 as shown in FIG. 6.

As already indicated, each input stroke SK is characterised by at least a stroke initiation location, a stroke terminal location and the path connecting the stroke initiation and the stroke terminal locations. Accordingly, the dot positioned for instance at the top of a character "i" (in the word "*felis*" in the text line LN1) constitutes a single stroke SK by itself.

It is assumed in the present case that the plurality of strokes ST of digital ink is input by a user in an electronic document 40 using the input surface 4 of the computing device DV1. A user may enter an input stroke SK with a hand or finger, or with some input instrument such as a digital pen or stylus suitable for use with the input surface 4. The user may also enter an input stroke SK by making a gesture above the input surface 4 if means configured to sense motions in the vicinity of the input surface 4 is being used, or with a peripheral device of the computing device DV1, such as a mouse or a joystick or the like.

It should be understood that the computing device DV1 may however acquire handwriting IN in any other appropriate manner.

In the present example, the computing device DV1 acquires the strokes SK as they are input by the user with the input surface 4 to perform on-line handwriting recognition. It should be noted, however, that the present invention may apply in an analogous manner to off-line handwriting recognition, i.e. by performing the concept of the invention on an image of handwriting which thus forms a static representation of handwriting. Temporal information regarding how the strokes are input relative to each other over time is thus not required.

In a text handwriting recognition step S4, the computing device DV1 recognises text by performing text handwriting recognition on the strokes SK acquired in S2. In particular, the computing device DV1 identifies in S4 the plurality of text lines LN1-LN24 from the recognised text. The text handwriting recognition S2 may be performed in any suitable manner, using any technique known to the skilled person (using for instance a sequential classifier).

By carrying out this text handwriting recognition S4, the computing device DV1 may recognise the characters CH formed by the strokes SK, the words WD formed by the characters CH and the text lines LN formed by the words WD, as part of a text recognition result.

In a particular example, the text recognition result obtained in S4 may provide more than one textual interpretations for the strokes SK which are processed. Different result candidates with associated confidence score may be produced for the text IN, words WD, and characters CH. Each text candidate (text, word, characters) may be associated with the constitutive strokes SK. The text handwriting recognition module S4 may select the text candidates with the best confidence scores. Since text handwriting recognition is known to the skilled person, no further details will be provided in this regard.

Each character (or symbol) CH is formed by one or a plurality of input strokes SK or at least by a portion of a stroke SK.

Additionally, each text line LN may be either part of a list item LI or not part of a list item (i.e. text item TI). An aim of the method is to identify list items LI and text (non-list) items TI from the plurality of text lines LN formed by the handwriting IN. Each list item LI and each text item TI identified as a result of the method may comprise one or a plurality of text lines LN.

Figure 5:
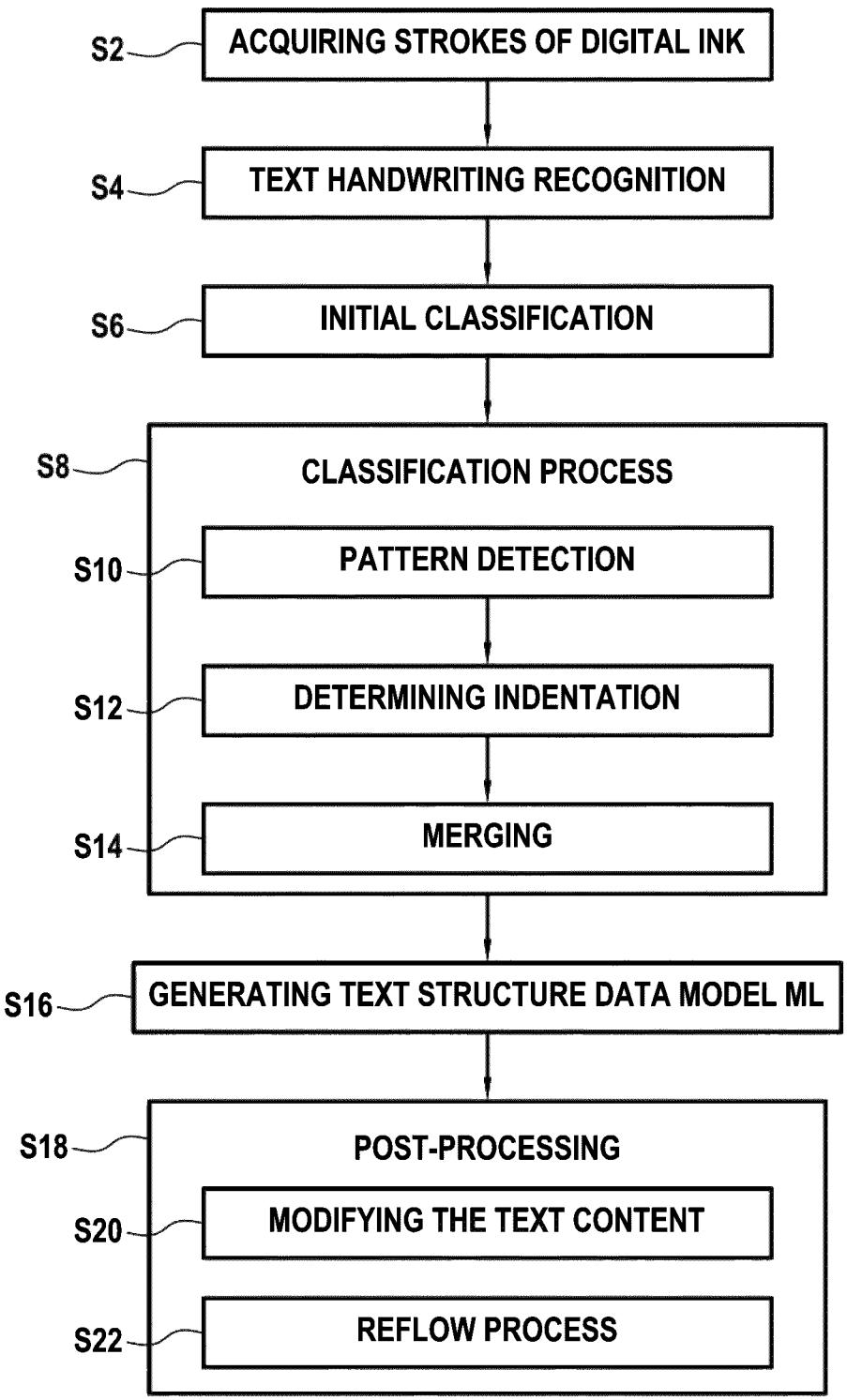
FIG. 5 depicts steps of a method for processing list and non-list content in handwriting according to a particular embodiment of the invention.

During an initial classification step S6, the computing device DV1 initially classifies each recognised text line LN as a distinct text item TI which is thus not part of a list. As a result, all text lines LN1-LN24 are classified as distinct text items TI (FIGS. 5-6). During this initial classification step S6, the computing device DV1 also classifies the two lines L0 as empty lines. The result of this initial classification may be stored (S6) by the model management module MD12 (FIG. 3) in a text structure data model ML in the non-volatile memory 8.

The table illustrated in FIG. 9 shows the corresponding states of the text structure data model ML while the computing device DV1 proceeds with classifying the text lines LN during the various steps of the method. The letter "T" stands for "text item", the letter L stands for "list item" and the letter "D" stands for empty line. The stage $t_0$ corresponds to the current state of the classification as a result of the initial classification step S6.

At this initial stage $t_0$, the text structure data model ML may comprise initial structural information obtained based on the text recognition result produced in the text handwriting recognition S4. In particular, the text structure data model ML may define each character CH in association with its constitutive stroke(s) SK, each word WD in association with its constitutive character(s) CH and each text line LN with its constitutive words WD, as determined in the text handwriting recognition S4. At this initial stage $t_0$, each text line LN is classified as a text item TI according to the text structure data model ML, as a result of the initial classification S6.

The model ML may comprise information defining the first and last stroke SK of each text line LN. The empty lines L0 (which are recognised as two consecutive empty lines in this case) may be classified in S6 and defined by the text structure data model ML as part of a same divider item D which separates two distinct items (each being either text item TI or list item LI). In other words, this divider item D may mark the end of a text/list item and the start of another text/list item within the handwritten text IN.

While the method proceeds forward, the text structure data model ML is updated by the model management module MD12 (FIG. 3) to reflect the classification results of the various steps of the method.

The computing device DV1 then proceeds with a classification process S8 (FIGS. 5 and 7) comprising successively a pattern detection step S10, an indentation determining step S12 and a merging step (or merging process) S14, to detect each text item TI and/or list item LI contained in the recognised handwritten text IN. While the method proceeds forward, the text structure data model ML is updated by the model management module MD12 (FIG. 3) to reflect the results of the pattern detection step S10 and the merging step S14.

Figure 7:
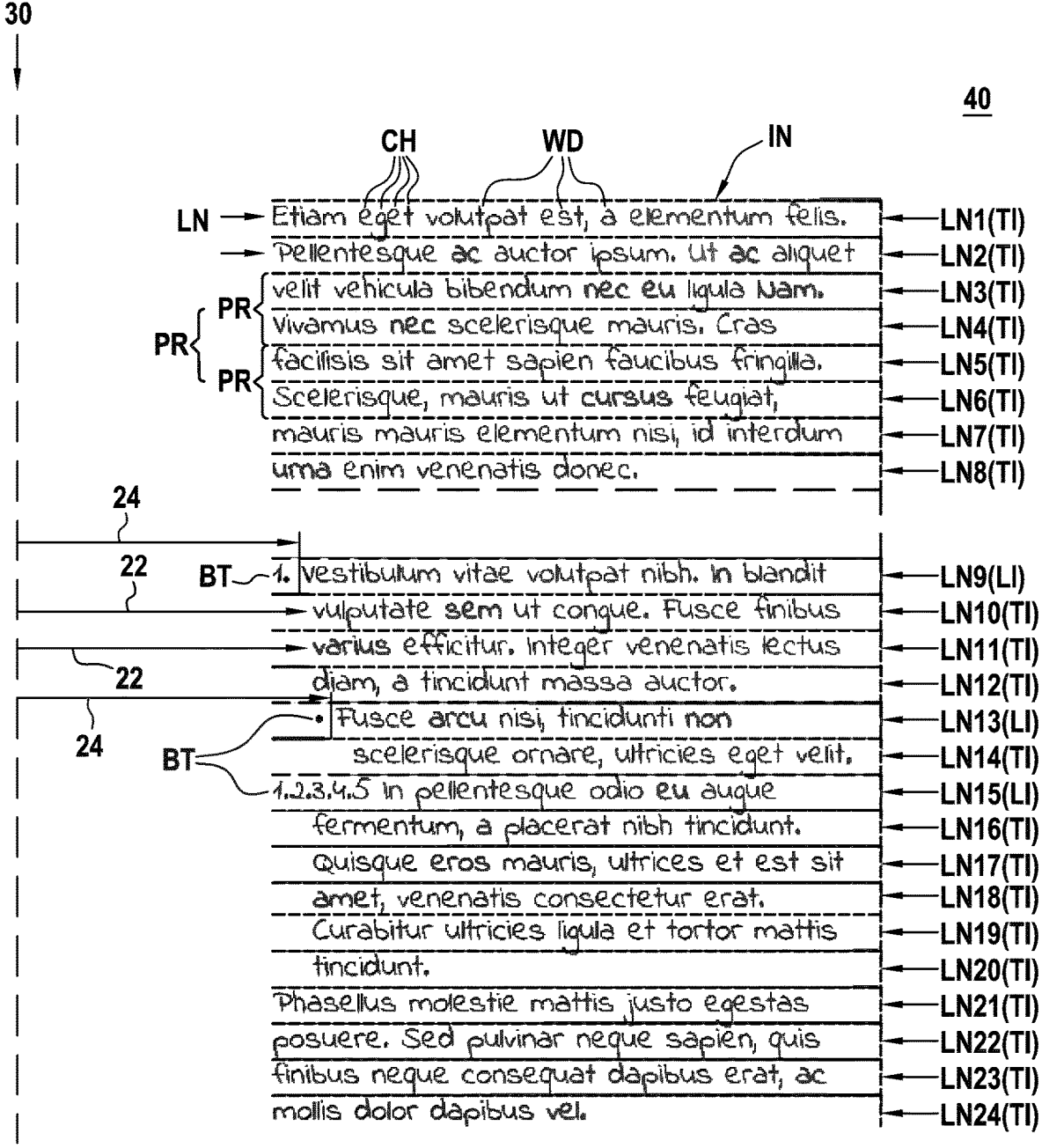

More specifically, during the pattern detection step S10, the computing device DV1 performs a pattern detection in each text line LN for determining whether said text line LN starts by a predetermined list symbol BT indicating that said text line LN is part of a list, and then reclassifies each text line LN starting with a predetermined list symbol as a distinct list item LI which is part of a list (FIG. 7). Since initially all the text lines LN1-LN24 are assumed to be text items TI, the computing device DV1 thus reclassifies each text line LN introduced by a predetermined list symbol BT as a distinct list item LI. As a result, starting from (or based on) the initial classification obtained in S6, each text line LN starting with a predetermined list symbol BT is reclassified as a distinct list item LI while any other text line LN retains its initial classification as a distinct text item.

In the present example, the pattern detection S10 is performed based on a set of predetermined list symbols BT stored in the non-volatile memory 8. In S10, the computing device DV1 examines the start of each text line LN and compares one or more starting strokes (e.g. a predefined number of starting strokes SK or a first character CH at the start of the text line LN) with the set of predestined list symbols BT. For instance, the pattern detection module MD6 compares, for each text line LN, a first symbol starting said text line LN with the set of predetermined list symbols BT to determine whether there is a match. If there is a match, the pattern detection module MD6 infers that the text line LN starts with a list symbol BT (a bullet or the like) and thus classifies the text line LN as a list item LI on its own.

Each text line LN in S10 which is not detected as starting by a predetermined list symbol BT is assumed at this stage to be a text item TI. As indicated earlier, each text line LN is initially classified (S6) as a distinct text item TI. Each text line LN detected in S10 to have no predetermined list symbol BT thus retains its initial classification as text item.

As described earlier, a list symbol BT may take various forms as long as it is defined as introducing a list item. In a particular example, the pattern detection module MDMD6 performs pattern detection using regular expression matching. The range of predefined list symbols may include the following Unicode Characters: HYPHEN-MINUS, NUMBER-SIGN, ASTERISK, etc. In addition to single character bullets, roman numbers, Arabic numbers, and letters separated by a period, and/or terminated with a closing parenthesis may also be recognised as list symbols BT. Here are a few examples of predetermined list symbols BT: "1)", "b.", "1.a", "vi" and "IV".

In FIG. 7 for instance, the computing device DV1 detects that the text lines LN9, LN13 and LN15 start with a list symbol BT (respectively "1.", "•" and "1.2.3.4.5") and thus reclassifies these text lines as distinct list items LI.

As shown in FIG. 9, the stage $t_1$ corresponds to the current state of the classification as a result of the pattern detection S10 performed on all text lines LN.

In response to the pattern detection step S10, the computing device DV1 proceeds with an indentation determining step S12 (FIGS. 5 and 7). In the indentation determining step S12, the computing device DV1 then determines an item indentation 22 of each text item TI with respect to a reference position 22 in the electronic document 40 and determines for each list item LI a text indentation 24 representing the indentation of text comprised in the list item LI with respect to the reference position 30. The determination of which text lines LN are considered as list items LI and which text lines LN are considered as text items TI at this stage is based on the result of the previous pattern detection step S10 (i.e. based for instance on the current classification state defined in the text structure data model ML).

In the present example (FIG. 7), the computing device DV1 thus determines (S12):
the item indentation 22 of the text items LN1-LN8, LN10-LN12, LN14 and LN16-LN24; and
the text indentation 24 of the list items LN9, LN13 and LN15.

At present, it is assumed that the item indentations 22 and text indentations 24 are determined as previously explained with respect to FIG. 4, although other indentation computation techniques may be contemplated. The table in FIG. 9 shows the value i computed by the computing device DV1 for each of the above-mentioned indentations determined in S12. As previously described (FIG. 4), these values i are representative of indentations with respect to the lateral reference position 30 in the electronic document 40. In the present example, the obtained values i for each indentation (either item indentation for text items TI or text indentation for list items LI) range from 0 to 1. These values of course depend on the column-based strategy used to perform the indentation computation.

In response to the indentation determining step S12, the computing device DV1 proceeds with a merging step S14

Figure 8:
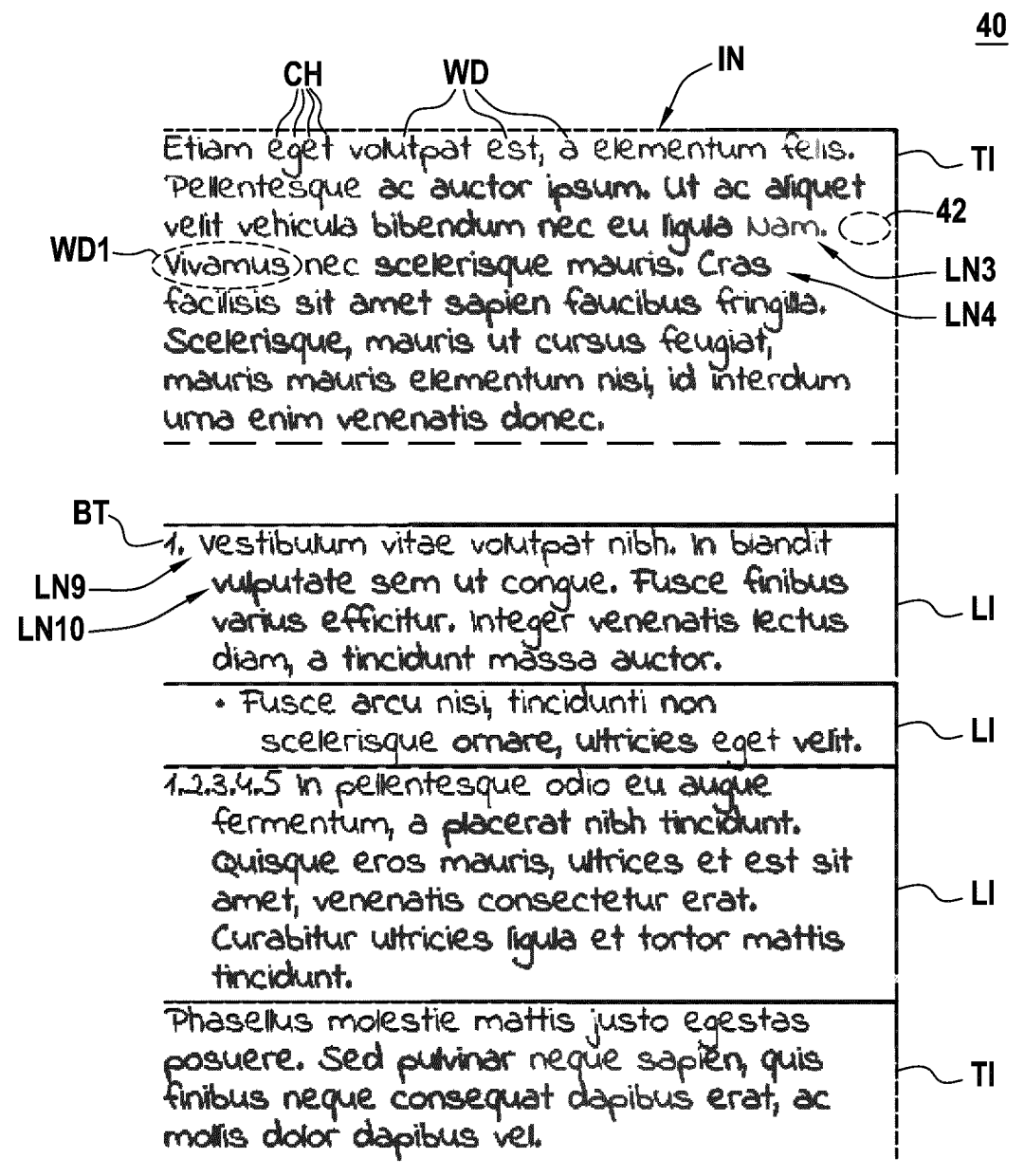

(FIGS. 5 and 7-8). In the merging step S14, the computing device DV1 then analyses each text item TI and list item LI recognised at this stage in the handwriting IN to determine, based on the indentations determined in the previous indentation determining step S12, which items (if any) should be merged together in a same item. To this end, the computing device DV1 examines successively each pair PR (FIG. 7) of consecutive text lines LN to determine if a predetermined merging condition CD is met and, if yes, merges the two text lines LN of the pair PR as part of a same item (either list item LI or text item TI). This is achieved by performing a line by line (or pair by pair) analysis for assessing whether merging two consecutive text lines LN is required, based on predefined rules.

More specifically, during the merging step S14, the computing device DV1:

merges, as part of a same text item TI, each pair PR of consecutive text lines LN formed by a first text line LN followed by a second text line LN if the first and second text lines of said pair PR are text items TI with a same item indentation 22 and if there is not enough free space in the end of the first text line LN to accommodate a first word WD starting the second text line LN (condition CD1); and merges, as part of a same list item LI, each pair PR of consecutive text lines LN formed by a first text line LN followed by a second text line LN if the first text line is a list item LI and the second text line is a text item TI with an item indentation 22 matching the text indentation 24 of the first text line and if there is not enough free space in the end of the first text line to accommodate a first word starting the second text line (condition CD2).

As can be seen above, two tests are applied in S14 on each pair PR of consecutive text lines LN to determine respectively if any one of these two conditions is met:

Condition CD1: are the first and second text lines LN of the pair PR text items TI with a same item indentation 22 AND is there is not enough free space in the end of the first text line LN to accommodate a first word WD starting the second text line LN?

Condition CD2: is the first text line of the pair PR a list item LI AND is the second text line a text item TI with an item indentation 22 matching the text indentation 24 of the first text line?

Each condition CD1 and CD2 thus comprises two sub-conditions which have both to be met for the corresponding condition to be satisfied.

In the present example, the merging module MD10 thus examines successively each pair PR of consecutive text lines LN to determine if any one of the conditions CD1 and CD2 is met. To this end, the merging module MD10 consults the text structure data model ML to determine the current item type (either text item TI or list item LI) of each text line LN and checks whether the condition CD1 or the condition CD2 is met in any of the pair PR.

By way of an example, the merging module MD10 examines (S14, FIG. 5) the pair PR formed by the consecutive lines LN3 and LN4 (FIG. 7-8). The merging module MD10 detects that the first text line LN3 and the second text line LN4 of this pair PR are both text items TI and thus verifies whether both text lines have item indentations 22 which match each other (i.e. have a same value i in the present example). Since both item indentations 22 match (i=0 for both text lines NLN3, LN4), the merging module MD10 determines whether there is enough free space (without text) at the end of the first line LN3 to accommodate the first word "Vivamus" starting the second text line LN2. At present, the merging module MD10 thus compares the free space 42 ending the first text line LN3 with the size (area occupied by) the first word "Vivamus". In the present example, there is not enough room in the area 42 to accommodate or position the entire word "Vivamus". Accordingly, the merging module MD10 merges the text lines LN3 and LN4 as part of a same text item IT.

This predefined condition CD1 is defined to take into account the natural handwriting of users. If a user leaves a relatively large free space at the end of a text line LN and starts handwriting on a next text line LN, it is likely that this next text line starts a new item (text item or list item) distinct from the previous item.

By way of another example, the merging module MD10 examines (S14, FIG. 5) the pair PR formed by the consecutive lines LN9 and LN10 (FIGS. 7-8). The merging module MD10 detects that the first text line LN9 of the pair PR is a list item LI while the second text line LN10 is a text item TI, and thus verifies whether the text indentation 24 of the first line LN9 matches the item indentation 24 of the second text line LN10 and also verifies whether there is not enough free space in the end of the first text line LN9 to accommodate a first word starting the second text line LN10. In the present example, since these two indentations match (the indentation value i=1 for both LN9 and LN10) and there is not enough free space in the end of the first text line LN9 to accommodate a first word "vulputate" starting the second text line LN10, the merging module MD10 merges the two text lines LN9 and LN10 as part of a same list item LI.

In the present example, the merging module MD10 considers that the text lines LN8 and LN9 are not consecutive to each other since they are separated by a divider item formed by the empty line L0.

In the present example, in the merging step S14, the merging module MD10 maintains as separate items each pair PR of consecutive text lines LN formed by a first text line followed by a second text line if the first item is a text item and the second item is a list item (according to the current state of the text structure data model ML).

By applying these two tests (based respectively on conditions CD1 and CD2) to each successive pair of consecutive text lines LN, the model management module MD12 (FIG. 3) updates gradually the structural information of the text structure data model ML, as represented in the stage $t_2$ of the table shown in FIG. 9. By merging together consecutive text lines LN in the merging step S14 as described above, text items TI and list items LI are recognised from the handwritten text IN. In the present example, as a result of the merging step S14, the text structure data model ML defines the following distinct items:

a text item TI formed by the text lines LN1-LN8;
a divider item D formed by the two empty line L0;
a list item LI formed by the text lines LN9-LN12;
a list item LI formed by the text lines LN13-LN14;
a list item LI formed by the text lines LN15-LN20; and
a text item TI formed by the text lines LN21-LN24.

In a variant, the computing device DV1 may recognise that the first line of a paragraph is indented relative to each other text line LN of that paragraph. Accordingly, the condition CD1 applied by the merging module MD10, as described above, to identify and merge plural text lines LN into a same text item corresponding to a same paragraph may be adapted to take into account that the first line of the paragraph has a different (i.e. higher) indentation value relative to the one of more other text lines of that same paragraph.

In a generating step S16, the model management module MD12 generates a text structure data model ML based on the result of merging step S14. In the present embodiment, this generation is performed gradually by storing the result of the text handwriting recognition S4 in the text structure data mode ML and by updating this model ML based successively on the results obtained in the initial classification step S4, in the pattern detection S10 and in the merging step S14. In a variant, the text structure data model ML is generated after the merging step S14, based on the results of the previous steps S4, S6, S10 and S14.

The invention provides for an efficient and reliable solution for determining the text structural decomposition, i.e. the structural arrangement, of handwriting. Thanks to the invention, list items in handwriting can be detected. In particular, the invention allows discriminating (or distinguishing) list and non-list elements in handwriting in an accurate and reliable manner, for instance to improve manipulations or editing on handwriting (as described further below). Paragraphs in handwriting may also be detected.

More particularly, efficient classification can be achieved by assuming initially that each recognised text line is a distinct text item and by performing a classification process which involves successively a pattern detection, an indentation determination and a merging process. The pattern detection is performed such that each text line starting by a bullet is reclassified from a distinct text item to a distinct list item, so that a first reliable discrimination between text and list items can be performed. Next, specific indentations are determined, namely item indentations for text items and text indentations for list items. Based on these specific indentations, a merging process can be efficiently performed to improve the classification result obtained in step a) of the classification process.

During the merging process, two different kinds of merging are then performed depending on the item nature (list/text item) of the text lines of each pair at hand. It allows merging text items together as part of a same text item (first merging) as well as merging a list item followed by a text item as part of a same list item (second merging). In both cases, the decision to proceed with the merging is based on whether there is enough free space at the end of the first text line of the pair to accommodate a first word of the second text line of the pair. These two mergings take into account the natural handwriting of human beings to determine with the best accuracy when text lines should be considered as part of a same text or list item.

In general, the text structure data model ML may decompose the recognised text IN into at least one text item TI and/or at least one list item LI, each item being associated with at least one text line LN and with each stroke SK belonging to said at least one text line LN. The model ML may associate every ink stroke SK to at least one character CH. Additionally, each character CH belongs to a single structural item (i.e. a text item TI, a list item LI, or possibly a divider item D if the latter are taken into account).

Various form, content and structure of the text structure data model ML may be contemplated.

In the present example, each text item TI, list item LI and divider item D encompass entire lines.

The model ML may further include at least one divider item corresponding to one or more empty lines. Each divider item D may separate two other items of the recognised text IN.

In the present example, the text structure data model ML thus decomposes the recognised text IN into a plurality of text items TI and a plurality of list items LI, including possibly the divider item D.

The text structure data model ML may identify each text item TI and each list item LI comprised in the recognised text IN. The model ML may include the following structural information (or any combination thereof) for each recognised item: item type (text item TI, list item LI, and possibly divider item D), strokes SK, characters CH, lines, start and end position. All the item (text/list items and dividers) may be represented by their begin and end cursor positions in the text.

In the text structure data model ML, each visible item (i.e. text and list items, but not divider items) may also be allocated their ink selection of all the characters CH they contain.

As described further below with respect to FIG. 10, the computing device DV1 may update the text structure data model ML based on later user instructions (received after the steps S2-S14) which cause alterations of the handwritten text IN acquired in S2.

Once the text structure data model ML has been generated in S16 (FIG. 5), the computing device DV1 may use it to edit the handwritten text IN. Various types and implementations of editing S18 may be contemplated.

In a particular example, the post-processing module MD14 performs an editing S18 of the recognised text IN based on the text structure data model ML. This editing S18 may comprise at least one of:
  modifying or altering (S20) the content of at least one text and/or list item of the recognised text IN; and
  a reflow process (S22) causing reflow of the digital ink of at least one text and/or list item of the recognised text IN.

The editing performed in S18 may thus comprise different kinds of modifications affecting the handwriting IN. The editing S18 may comprise one or more ink modification alterations, according to which at least one ink stroke SK of the handwriting IN is altered by modification, addition or deletion. In a particular example, the alterations caused by the user instructions comprise adding at least one new stroke SK into the electronic document 40 and/or removing or modifying at least one existing stroke SK (ink modification alteration). The editing S18 may also comprise one or more reformatting alterations (no ink added, modified or removed) requiring reflow of one or more existing items (text and/or list items) of the handwriting IN. In this case, a reflow process thus causes reflow of the digital ink of at least one item of the handwriting IN.

In response to the editing S18, the computing device DV1 may perform once again a text handwriting recognition on the edited handwritten text to produce a new text recognition result to update the text structure data model ML.

On the contrary, text reflow designates a process by which text is moved to fit to a particular display area (e.g. page, screen, window). Text reflow is well known to the skilled person as it allows to improve readability and thus facilitates comprehension for a reader. A text reflow may be triggered by the computing device DV1 whenever the application 12 needs it.

The classification process S8, and more particularly the merging process performed in step S14 (FIG. 5), allow for a rapid and dynamic response of the list processing when any alteration takes place. This is because the classification process S8 allows for each text line LN of the handwritten text IN to be classified as part of either a text item or a list item. In this particular example, the text structure data model ML defines each text line LN as part of either a text item TI or a list item LI. As a result, when editing takes place in S18, the computing device DV1 can process only the affected text lines LN to reassess their classification (as part of a list item or text item), for instance by carryout out the steps S4 to S16 as previously described or by any other appropriate manner (FIG. 5). Without the merging process S14, all text lines LN would need to be reassessed every time editing is performed on the handwritten text IN, which would lead to time and processing overcost.

Thus, the merging process S14 allows for quick reprocessing of the handwritten text IN as only the affected text lines LN (by any editing, i.e. ink modification alterations and/or reformatting alterations) are reprocessed, which allows for faster and more coherent results of the list/text classification.

During the editing S18, the computing device DV1 uses the information of the text structure data model ML to control the way text is edited (modified, reflowed, etc.), thereby improving the user experience. For instance, reflow of text can be improved by automatically aligning each text line LN of a same list item LI. Automatic content editing such as adding bullets, change bullets, etc. may also be applied on list items. Thanks to the present invention, manipulation of text can be adapted based on the structural decomposition of the text, in particular to perform adapted editing to list and non-list content.

The computing device DV1 may also update the text structure data model ML to reflect the editing S18 performed on the text IN.

The editing S18 may be performed in response to user instructions input by any appropriate manner to the computer device DV1 (e.g. via the input surface 4 or any user interface of the computing device DV1). Other examples are however possible where editing (S16) on the handwriting IN is performed automatically by the computing device DV1, i.e. triggered by the computer device DV1 in the absence of any user instruction for editing the handwriting IN.

For instance, the user may use a keyboard to input special instructions to edit the handwritten text IN (e.g. tabulation, return). Predefined gestures may also be input by a user.

In a particular example, a split gesture (e.g. downward) may be input to split a line, which may be equivalent to activating a keyboard Return key. When the split instruction commands to perform a split with a text line, that text line is split in two distinct text lines and the item (text or list item) to which that text line belongs to is also split in two distinct items. A split gesture between two consecutive characters of a same words WD may cause splitting this word WD in two words, while a split gesture between two consecutive words WD may cause breaking the line in two distinct lines.

Likewise, a join gesture (e.g. upward) may be input to join two lines or two words depending on the case.

Various other user instructions may be contemplated that cause modifications or editing of handwritten text.

In a particular example, during the reflow process S22 (FIG. 5), a text or list item which has been previously separated from an immediately preceding item in response to a user splitting command is merged into said immediately preceding item only in response to a user join command to join the two items together.

In a particular embodiment, the text structure data model ML may classify the text item type into two sub-types, namely the explicit (or first) text items and the implicit (second) text items. In other words, the model ML may define each text item TI as either an explicit text item or implicit text item. Are defined as explicit text items, the text items TI which are created in response to a predetermined user instruction input to the computing device DV1, such as a splitting instruction, a splitting instruction, etc. On the contrary, are defined as implicit text items, items which are assumed to be text item TI by the computing device DV1 and thus classified as such, without having received a predetermined user instruction to confirm this classification.

For instance, each text line LN is classified in the initial classification S2 (FIG. 5) as an implicit text item TI while a text item created in response to a split gesture (or break instruction) is classified as an explicit text item.

Defining text items as explicit or implicit text items in the text structure data model ML thus allows further improving how the text is manipulated by maintaining a global text structure which is consistent with the user intent.

Further, as indicated earlier, the computing device DV1 may update the text structure data model ML after the generation step S16, in response to acquiring user instructions causing alterations to the recognised text IN, i.e. the text IN recognised in text handwriting recognition S4.

Figure 10:
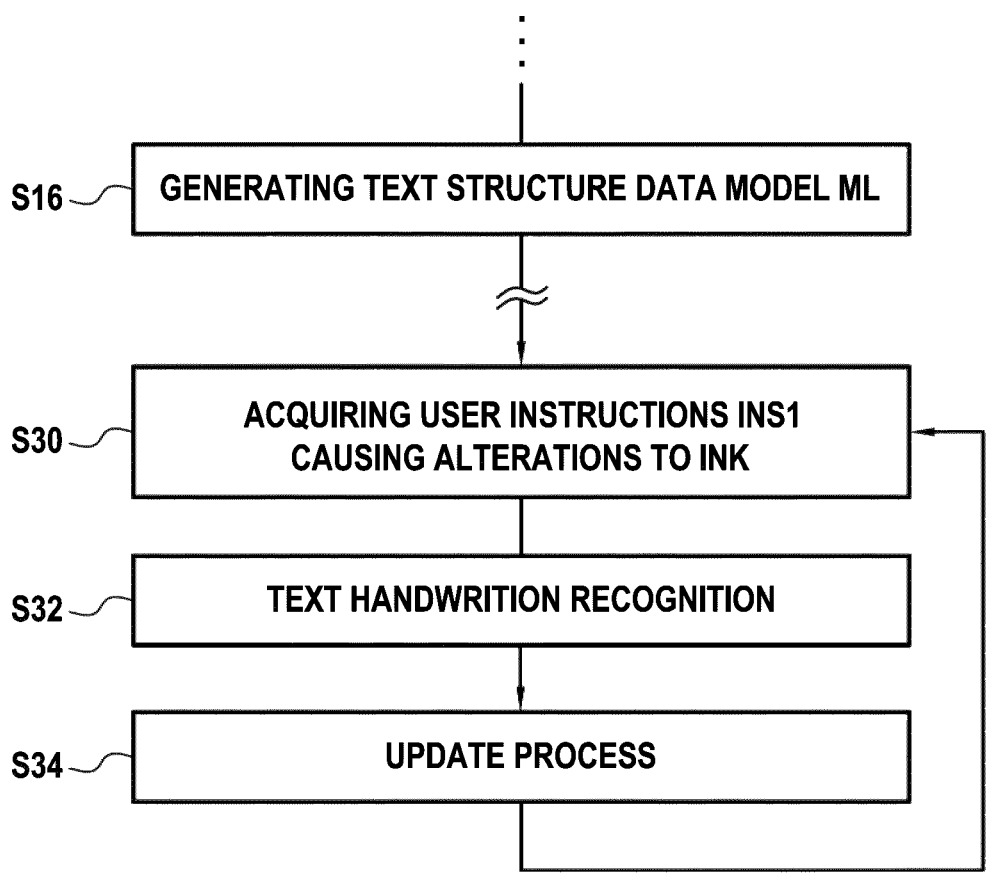
FIG. 10 depicts steps of a method for processing list and non-list content in handwriting according to a particular embodiment of the disclosure.

The FIG. 10 depicts a particular embodiment according to which the computing device DV1 acquires (S30), after the generating step S16, user instructions INS1 causing editing or alterations to the recognised text IN being displayed.

In the present case, the alterations caused to the recognised text IN imply that at least one ink stroke SK of the handwriting IN is altered by modification, addition or deletion (ink modification alteration). In other words, the alterations caused by the user instructions INS1 comprise adding at least one new stroke SK into the electronic document 40 and/or removing or modifying at least one existing stroke SK.

In a recognition step S32, the computing device DV1 recognises the altered handwritten text IN by performing text handwriting recognition in an analogous manner to step S4 (FIG. 5), thereby producing a new recognition result representative of the recognised text as now altered.

In an update process S34, the computing device DV1 updates the text structure data model ML based on the new recognition result obtained in S32. In a particular example, in response to the user instructions INS1, the computing device DV1 edits on display the content of the handwritten text IN and updates the text structure data model ML accordingly. This update of the model ML may comprise switching for instance the definition of at least one item from text item TI to list item LI and/or switching at least one item from list item LI to text item TI.

The update process S34 may comprise updating the text structure data model ML by deleting any removed stroke SK from the text structure data model ML and by allocating any new stroke SK to an existing or new item, either text or list item, of the text structure data model ML. In other words, new ink added or removed may simply trigger bookkeeping in the text structure data model ML to allocate any added stroke, character and word to a corresponding text line and to the item (text item TI or list item LI) to which it belongs. For each new item, any new ink stroke SK, new character CH, etc. are allocated to that new item. If no ink remains in an existing item as a result of the alterations, the entire item is deleted.

The steps S30-S34 may be repeated a plurality of times to maintain up-to-date the text structure data model ML so that it is always representative of the current state of the handwriting input IN. A structural decomposition analysis may thus be carried out incrementally upon each new user input (i.e. upon each acquisition of new text input).

In the embodiment depicted in FIG. 10, a new text handwriting recognition S32 is triggered to recognise the text IN altered by the user instructions INS1. In a variant, the user instructions INS1 cause manipulations (text reflow or any reformatting alteration as described earlier) without actually altering the content of the text (no alteration of the existing strokes by addition, modification and/or alteration). In that case, the method may proceed from the acquiring step S30 to the update process S34 without performing a new text handwriting recognition S32 (FIG. 10).

As described earlier, the text structure data model ML defines each text line LN as part of either a text item TI or a list item LI. As a result, when editing takes place in S34 in response to the user instructions INS1, the computing device DV1 can process only the affected text lines LN to reassess their classification (as part of a list item or text item). Reprocessing of the affected text lines LN can be achieved in various ways, such as by repeating the classification process S8 as previously described (FIG. 5) or by any other specific updating technique (as described below). Without the merging step S14, all text lines LN would need to be reassessed every time editing is performed on the handwritten text IN, which would lead to time and processing overcost. The merging process performed in step S14 (FIG. 5) of the method thus allows for rapid and dynamic response of the list processing when any alteration or editing to the handwriting takes place.

In particular, by using the update process S34 (FIG. 10) as described above, the invention allows for dynamic item and indentation determination when a user performs alterations to the digital ink that may modify part of a list or text item as previously classified.

Particular examples of implementing the update process S34 (FIG. 10) are now described herebelow.

Figure 11A:
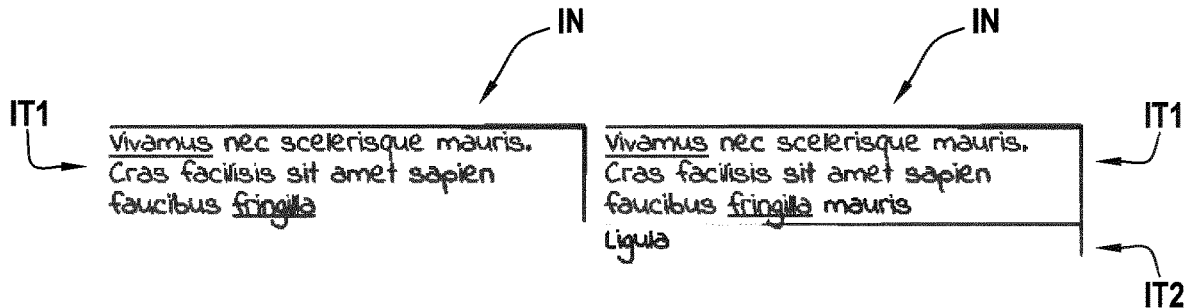
FIGS. 11A, 11B, 11C and 12-14 represent handwriting input processed by a method, according to particular embodiments of the invention.

As shown in FIG. 11A, upon detecting in S34 (FIG. 10) that the alterations caused by the user instructions INS1 lead to the addition into the recognised text IN of one or more new ink strokes SK that was not part of the text recognition result of the preceding text handwriting recognition (S4 or S32), the computing device DV1 allocates in the text structure data model ML each new stroke SK to the text line LN in which it appears. For new ink strokes SK that appear on a new text line LN, the computing device DV1 may create a new text item (e.g. a new implicit text item) enclosing whole text lines LN.

In the example shown in FIG. 11A, as a result of the text handwriting recognition S32 (FIG. 10), it is detected that the word "mauris" is added to an existing item IT1 (a text item TI in this case) and that a new item IT2 (a text item TI in this case) is created for the new word "Ligula". In this example, the steps S10 S12 and S14 (as previously described with reference to FIG. 5) are applied on the items IT1 and IT2, and as a result, these items IT1, IT2 are not merged because there is enough space at the end of the item IT1 to accommodate the first word "ligula" of the second item IT2.

Figure 11B:
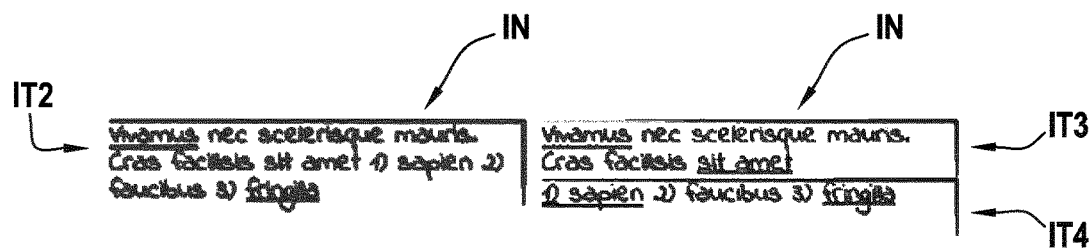

In the example shown in FIG. 11B, a split instruction (e.g. a split gesture or Return key input) is acquired as the user instruction INS1 in S30 (FIG. 10). The split instruction INS1 is acquired at a location between the words "amet" and "1)" in the text item IT2 of handwritten text IN, thereby causing a line break between these words. Upon detecting that the word "1)" constitutes a valid list symbol BT, the computing device DV1 updates the text structure data model ML by splitting the text item IT2 into two items, i.e. a text item IT3 ending with the word "amet" and a list item IT4 starting with the list symbol "1)".

Figure 11C:
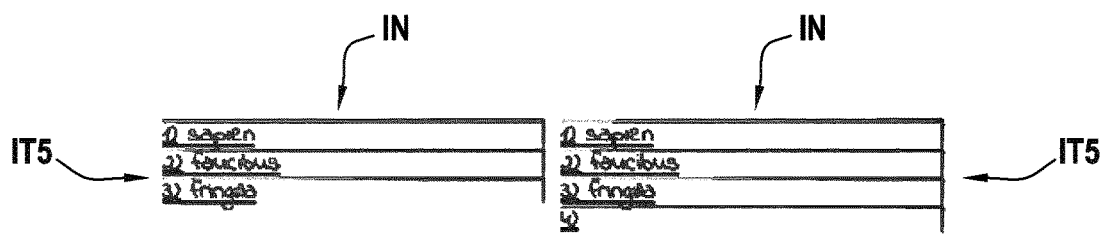

In the example shown in FIG. 11C, the computing device DV1 detects that the Return command is pressed while the cursor is at the end of a list, thereby creating a new list item within the list by creating a new list symbol "4)" automatically.

In particular embodiments shown in FIGS. 12-15, the computing device DV1 defines detection zones in the text structure data model ML for each text item TI and each list item LI (during the generating step S16 of FIG. 5; and during the update process S34 of FIG. 10). These detection zones may include the following (or any combination thereof):
- a begin zone Z1 defining a begin portion at the start of each text item TI;
- a bullet zone Z2 defining a begin portion at the start of each list item LI; and
- an end zone Z3 defining an end portion at the end of each item (list items LI and text items TI).

These detection zones Z1, Z2 and/or Z3 may be used to facilitate update of the text structure data model ML when the recognised text is altered, thereby saving cost in time and resources and thus further improving the user experience.

Figure 12:
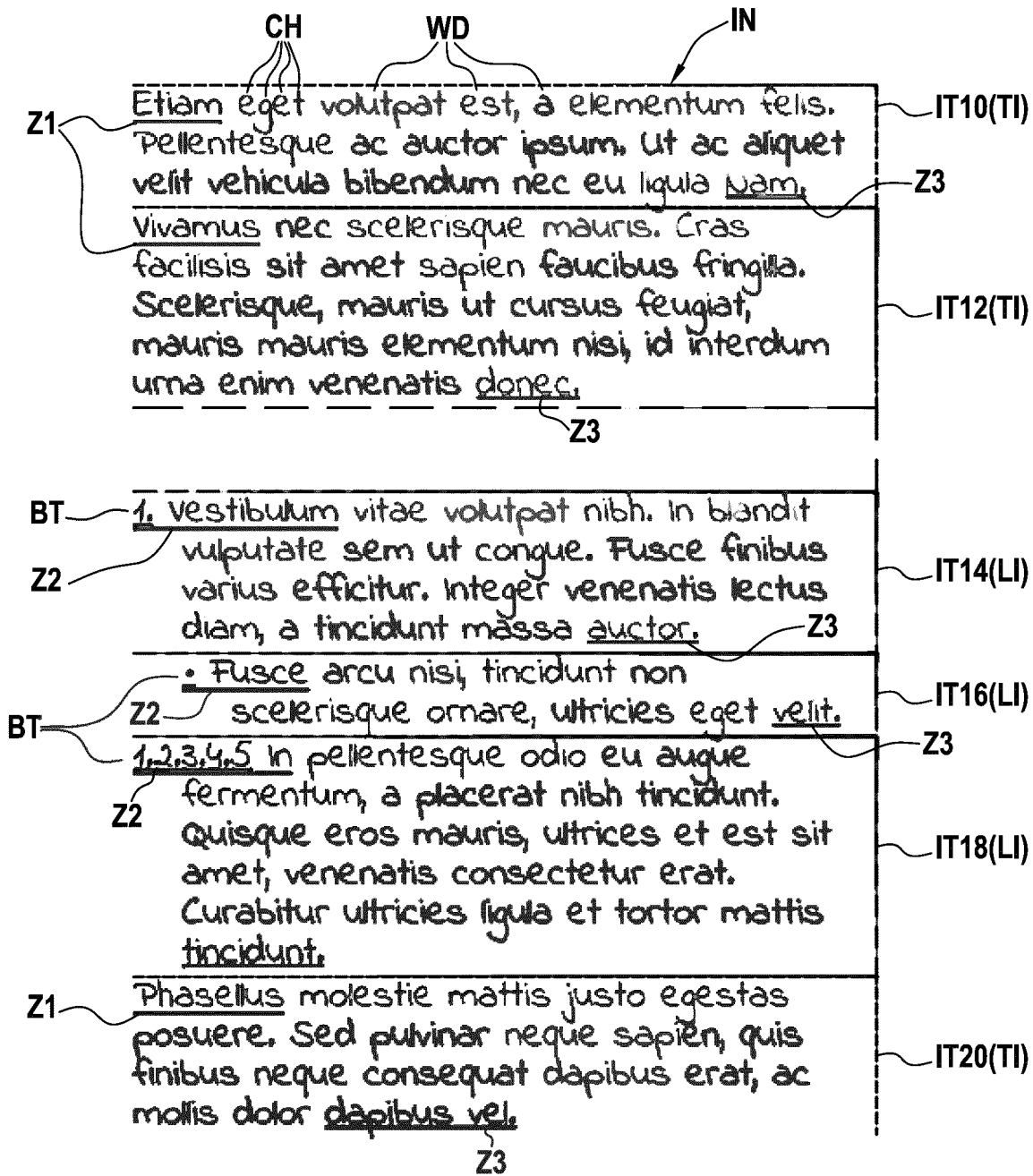

More specifically, the FIG. 12 shows the handwritten text IN recognised and processed by the computing device DV1 in the example of FIGS. 6-8. It is assumed that the steps S2-S16 (FIG. 5) have been performed as previously described. Accordingly, a text structure data model ML representative of the result of the merging step S14 (FIGS. 8-9) has been generated in the generated step S16. As shown in FIG. 12, it is assumed that the following items have been defined in the text structure data model ML:
- items IT10 and IT12 classified as text items IT;
- items IT14, IT16 and IT18 classified as a list items LT; and
- item IT20 classified as a text item TI.

In the present example, in the generating step S16, the computing device DV1 defines:
- for each text item TI, a begin zone Z1 which starts at the first visible character CH in said text item TI and extends forwards to enclose one or more complete words WD until a predefined number (e.g. a number of 5) of consecutive visible characters CH is reached or less if said beginning zone Z1 reaches the end of said text item TI; and
- for each list item LI, a bullet zone Z2 which starts at the predefined list symbol BT of said list item LI and extends forwards to enclose one or more complete words WD until a predefined number (e.g. a number of 5) of consecutive visible characters is reached or less if said bullet zone Z2 reaches the end of said list item LI.

In other words, the text structure data model ML defines a begin zone Z1 (and a bullet zone Z2 respectively) for each text item TI (for each list item LI respectively).

In the present example, the begin zones and bullet zones are limited to single lines.

Still in this example, it is considered that the bullet zone Z2 of each list item LI encompasses at least one visible character past (consecutive to) the list symbol (if there is any such visible character).

As shown in the present example of FIG. 12, the computing device DV1 defines the following detection zones in the text structure data model ML:
- item IT10: begin zone Z1 "Etiam";
- item IT12: begin zone Z1 "Vivamus";
- item IT14: bullet zone Z2 "1. vestibulum";

item IT16: bullet zone Z2 "• Fusce"; etc.

During the update process S34 (FIG. 10), the computing device DV1 may perform a so-called begin zone update whereby it tests the begin zone Z1 of each text item TI and the bullet zone Z2 of each list item LI for modifications. That is, the computing device DV1 checks, for each begin zone Z1 and bullet zone Z2, whether at least one ink segment SK of that zone has been deleted or if at least one ink segment SK has been inserted in that zone or added left of that zone. More particularly, during the update process S34, the computing device DV1 may determine for each list and text item whether the alterations caused by the user instructions INS1 modify its beginning zone Z1 or bullet zone Z2 (condition CD3) and/or whether at least one character CH (or stroke SK) is added before said beginning zone Z1 or bullet zone Z2 (condition CD4). In the affirmative (i.e. if at least one of conditions CD3 and CD4 is met), the computing device DV1 updates in S34 the begin zone Z1 or bullet zone Z2 based on the alterations caused by the user instructions INS1 and repeats the pattern detection S10, the indentation determination S12 and the merging step S14 (FIG. 5) as part of the update process S34, based on the updated begin zone Z1 or updated bullet zone Z2, to update the text structure data model ML. Otherwise (i.e. if none of conditions CD3 and CD4 is met), the computing device DV1 does not update the begin zone Z1 or bullet zone Z2, does not perform the steps S10-S14 and simply updates the model ML (bookkeeping) so that it represents the current state of the handwritten text IN.

In other words, the way the text structure data model is updated in S34 (FIG. 10) is adapted as a function of whether the begin zones Z1 and bullet zones Z2 are affected by the alterations caused by the user instructions INS1, thereby improving efficiency of the update process. In particular, these zones allow detecting changes in a list symbol of list item LI and also allow detecting creation of new list symbols at the beginning of existing text items, as described further below.

Figure 13:
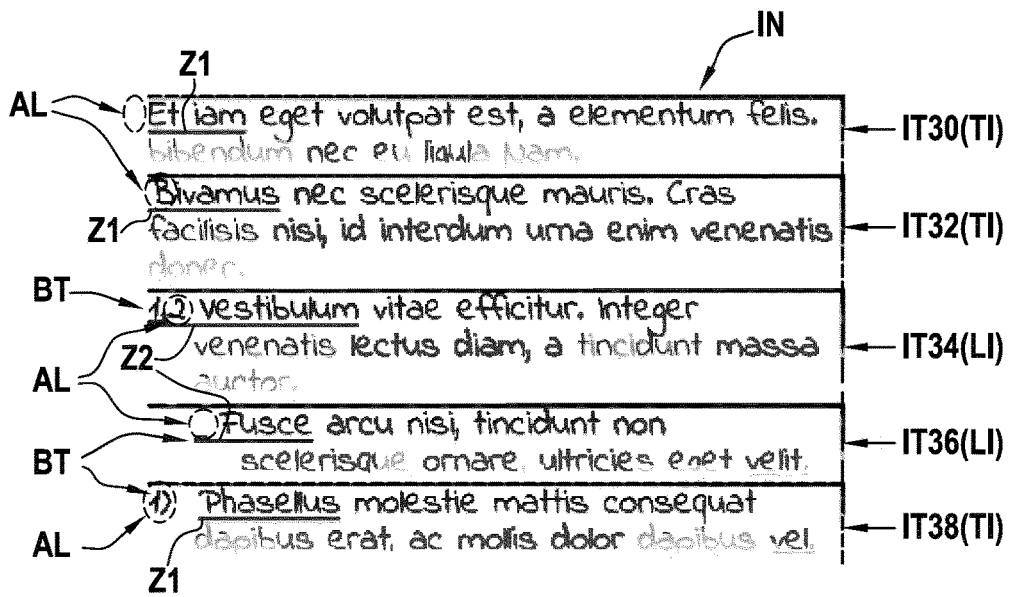

The FIG. 13 depicts an example where various alterations—noted AL—are made to the begin zone Z1 or bullet zone Z2 of text items IT30, IT32, IT34, IT36 and IT38, in response to user instructions INS1 acquired in S30 (FIG. 10). Once the text handwriting recognition S32 is completed, the computing device DV1 performs an update process S34. As part of the update process 34, the computing device DV1 tests the begin zones Z1 and bullet zones Z2 for modifications. In the present case, the alterations are as follows:
  part of the begin zone Z1 of the text item IT30 is deleted;
  the first character of the begin zone Z1 of the text item IT32 has been overwritten;
  a new character "2" is inserted into the bullet zone Z2 of the list item IT34;
  the list symbol BY in the bullet zone Z3 of the list item IT36 has been erased; and
  new characters "1)" have been added left of the begin zone Z1 of the text item IT38).

In each of the above cases, the computing device D1 detects in S34 that the begin zone Z1 or bullet zone Z2 is affected by the alterations AL and thus updates these zones and performs the pattern detection S10, indentation determination S12 and merging step S14 on the modified items as part of the update process S34. As a result, the items IT30 and IT32 remain text items TI, the item IT34 remains a list item LI (with a new list symbol "1.2"), the list item IT36 is reclassified as a text item (since it no longer has a list symbol at the front) and the text item IT38 is reclassified as a list item LI since it now starts with the list symbol "1)".

In the above example, begin zones Z1 and bullet zones Z2 are checked at the beginning of each text and list item to update the text structure data model ML. However, as shown in FIG. 14, a similar process—so-called bullet detection—may be performed in the begin zone Z1 of each text line LN past the first text line of the text and list items.

More particularly, during the generating step S16 of FIG. 5, the computing device DV1 may define in the text structure data model ML, for each text item TI and each list item LI, a respective begin zone Z1 which starts at the first visible character CH in each text line LN of said item past its first text line LN and extends forwards to enclose one or more complete words until a predefined number (e.g. a number of 5) of consecutive visible characters CH is reached or less if said begin zone Z1 reaches the end of said text line.

During the update process S34 (FIG. 10), the computing device DV1 checks, for each text item TI and each list item LI, each text line LN past its first text line for any new stroke SK added within the begin zone Z1 or before the begin zone Z1 of said text line LN in response to the user instructions INS1 acquired in S30. For each positively checked text line LN (new stroke(s) SK added within and/or before its begin zone Z1), the computing device DV1 determines whether said text line LN starts by a predetermined list symbol BT indicating that said text line LN is part of a list (by performing a pattern detection as in S10 of FIG. 5). In the affirmative, the computing device DV1 splits the corresponding text item TI or list item LI to create a new list item LI starting with the predetermined list symbol BT and updates the text structure data model ML to reflect this splitting. Contrary to the begin zone update performed in the update process S34 as described earlier with reference to FIG. 13, this bullet detection process is only interested in added ink segments SK.

Figure 14:
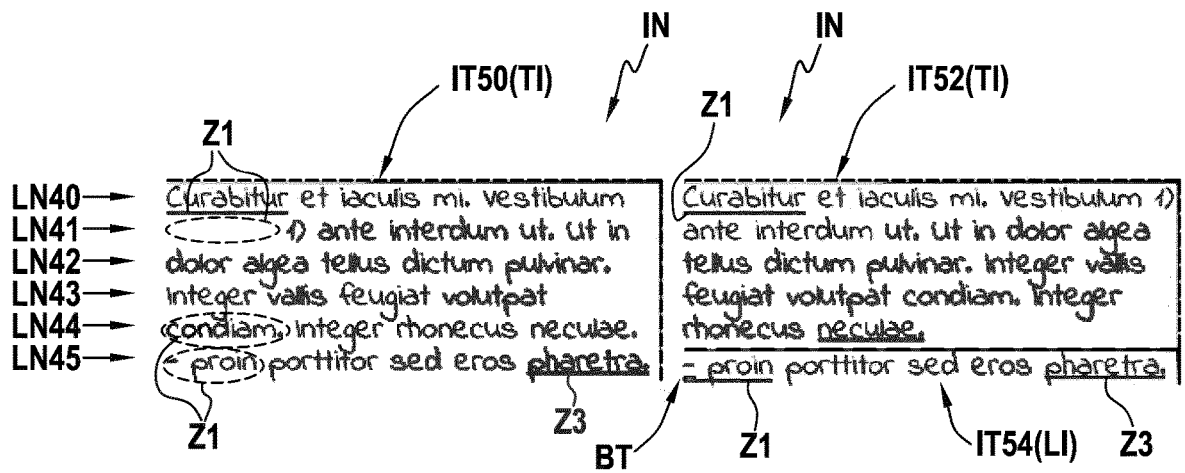

For instance, FIG. 14 shows handwritten text IN on which basis the computing device DV1 has performed the steps S2-S16 (FIG. 5) as previously described. It is assumed that a text item IT50 has been defined in the text structure data model ML, this item comprising the consecutive text lines LN40-LN45. By performing the above-described bullet detection in the begin zone Z1 of each text line LN of item IT50 past its first text line (namely in text lines LN41-LN45), the computing device DV1 does not detect that a list symbol BT starts the text line LN41 since a word has been removed but no new ink stroke has been added before or within the begin zone Z1 of that text line LN41. On the other hand, the computing device DV1 detects that new strokes SK have been added before or within the begin zone Z1 of the text lines LN44 and LN45 (i.e. the characters "con" and "-" have been added at the beginning of text lines LN44 and LN45 respectively). The computing device DV1 thus checks the text lines LN44 and LN45 for any list symbol BT by performing pattern matching (like in pattern detection S10, FIG. 5). As shown in FIG. 14 (right part), the computing device DV1 detects the presence of a list symbol BT "-" at the beginning of text line LN45 and thus splits the text item IT50 into two items IT52 and IT54, by creating the new list item IT54 starting with the list symbol "-" and by updating the text item IT50—now called IT52—so that it now ends with the word "neculae.". The text structure data model ML is updated accordingly in S34 to reflect these changes.

In a particular example, bullet detection may be performed in any part of a text or list item in response to detecting addition of at least one ink stroke SK. In the present example, during the update process S34 (FIG. 10), the computing device DV1 performs the following: detecting at least one stroke SK added within a text line LN of a text or list item in response to the user instructions INS1 acquired in S30; determining whether said text line LN starts by a predetermined list symbol BT indicating that said text line LN is part of a list (by performing a pattern detection as in S10 of FIG. 5); and in the affirmative, splitting the corresponding text item or list item to create a new list item IT and updating the text structure data model ML to reflect this splitting.

In the above examples, begin zones Z1 are used to improve efficiency of the update process when user instructions INS1 are received. An analogous update process may be performed based on the end zones Z3 of each text and list item.

In a particular example shown in FIG. 12, when generating in S16 (FIG. 5) the text structure data model ML, the computing device DV1 defines, for each text and list item, an end zone Z3 which extends backwards from the last visible character CH of said item by enclosing one or more completes words WD until a predefined number (e.g. a number of 5) of consecutive visible character CH is reached or less if said end zone Z3 reaches the beginning of said item.

As shown in the present example of FIG. 12, the computing device DV1 defines the following detection zones in the text structure data model ML:
item IT10: end zone Z3 "Nam.";
item IT12: end zone Z3 "donec.";
item IT14: end zone Z3 "auctor.";
item IT16: end zone Z3 "vent"; etc.

During the update process S34 (FIG. 10), the computing device DV1 may perform a so-called item merging whereby it determines for each item IT10-IT20 whether the alterations caused by the user instructions INS1 modify its end zone Z3 and/or whether at least one stroke SK is added after the end zone Z3 and, in the affirmative, it updates said end zone Z3 based on the alterations and it repeats said the merging step S14 (FIG. 5) as previously described, based on the updated end zone Z3 to update the text structure data model ML.

The computing device DV1 may be configured to use only the begin zones Z1 and bullet zones Z2 or, alternatively, only the end zones Z3 when performing the update process S34 (FIG. 10).

Using the begin zones Z1, bullet zones Z2 and end zones Z3 enables the computing device DV1 to focus on changes occurring in key parts of the text lines LN, thereby limiting the amount of calculation necessary to update the structure data model ML.

The system can focus on the beginning and end of each item and adapt how the text structure data model is updated accordingly, thereby improving efficiency and saving time and resources.

Figure 15:
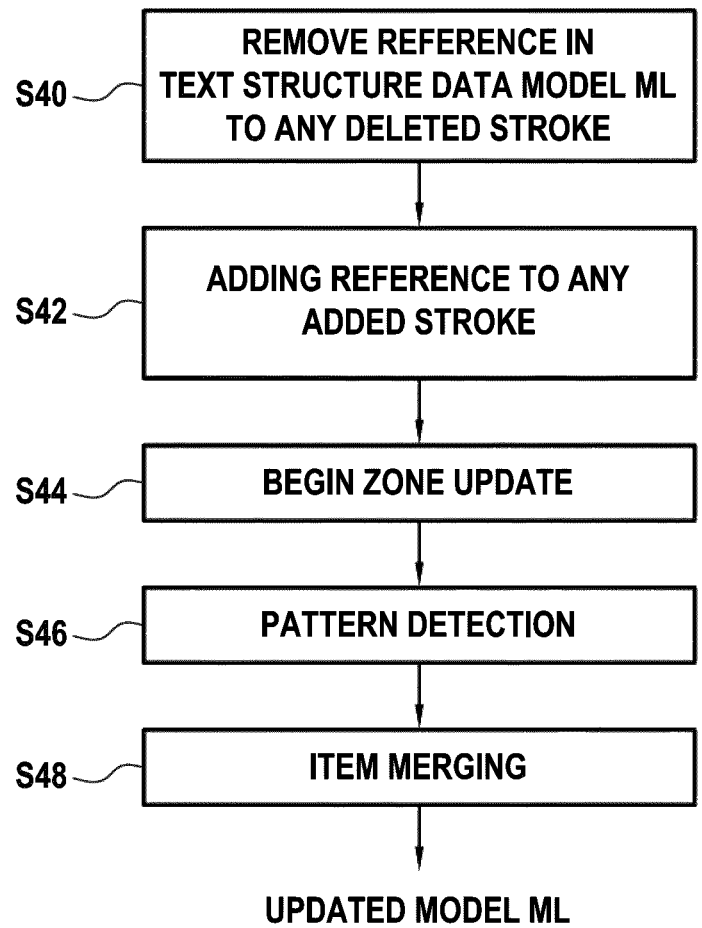
FIG. 15 depicts steps of a method for processing list and non-list content in handwriting according to a particular embodiment of the invention.

The update process S34 (FIG. 10) according to a particular embodiment is now described with reference to FIG. 15. It is assumed that the update process S34 is performed on a handwritten text IN (e.g. as shown in FIG. 8) upon acquiring user instructions INS1 causing alterations to the text IN.

In a step S40, the computing device DV1 updates each list item LI and text item TI to remove references to any deleted ink segment SK (i.e. any character CH and word WD that have been deleted). If no ink remains in an item, it is deleted.

In a step S42, any new ink segment SK (i.e. any new character CH and word WD) is added into the text structure data model ML. For each item, any new ink segment SK appearing in a text line LN of that item is allocated to said item. For new ink segment INK appearing in a new text line LN, a new text item (e.g. a new implicit text item) enclosing the whole text line is created.

In a step S44, the begin zone Z1 of each text item TI and the bullet zone Z2 of each list item LI are tested for modifications and the text structure data model ML is updated by performing the begin zone update as previously described with reference to FIGS. 12-13.

In a step S46, the text lines of each text and list item past their first text line are tested for added ink segments and the text structure data model ML is updated by performing the bullet detection as previously described with reference to FIG. 14.

In a step S48, the end zone Z3 of each text and list item is tested for modification and the text structure data model ML is updated by performing the item merging as previously describe with reference to FIGS. 5 and 10.

By performing successively the steps S40-S48, the text structure data model ML can be efficiently updated so that it is always representative of the current state of the handwriting input.

In a particular example, in response to a split command (e.g. a split gesture) received as user instructions INS1 (FIG. 10) for splitting an existing item into two distinct items:
if the split command specifies a splitting location at the start or end of a text line, an empty line is inserted at said splitting location; and if the split command specifies a splitting location within a text line, the update process comprises:

splitting said text line at the splitting location into a first text line and a second text line belonging respectively to a first item and a second item obtained from splitting said existing item;

determining whether the second text line starts by a predetermined list symbol indicating that said second text line is part of a list; and in the affirmative, classifying the second item as a list item, otherwise classifying the second item as a text item.

In a particular example, two consecutive items are merged into a same item during the update process S34 (FIG. 10) only in response to a user instruction INS1 to join two distinct items together. If two items are consecutive, they are merged during the update process S34 only in response to an explicit join instruction.

It should be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved.

While not explicitly described, the present embodiments may be employed in any combination or sub-combination thereof.

This disclosure having been described in particular embodiments, it is clear that it is susceptible to numerous modifications and embodiments within the ability of those skilled in the art and without the exercise of the inventive faculty. Accordingly, the scope of the invention is defined by the scope of the following claims.

The invention claimed is:

1. A method implemented by a computing device for processing lists in handwriting, comprising:
   recognising text by performing text handwriting recognition on a plurality of strokes of digital ink in an electronic document, said text comprising a plurality of successive text lines;
   initially classifying each recognised text line as a distinct text item which is not part of a list;
   a classification process comprising the following steps:
      a) pattern detection in each text line for determining whether said text line starts by a predetermined list symbol indicating that said text line is part of a list, and classifying each text line starting with a predetermined list symbol as a distinct list item which is part of a list;
      b) in response to step a), determining an item indentation of each text item with respect to a reference position and determining for each list item a text indentation representing the indentation of text comprised in said list item with respect to the reference position;
      c) in response to step b), a merging process comprising:
         merging, as part of a same text item, each pair of consecutive text lines, in said text, formed by a first text line followed by a second text line if the first and second text lines of said pair are text items with a same item indentation and if there is not enough free space at the end of the first text line to accommodate a first word starting the second text line; and
         merging, as part of a same list item, each pair of consecutive text lines formed by a first text line followed by a second text line if the first text line is a list item and the second text line is a text item with an item indentation matching the text indentation of the first text line and if there is not enough free space in the end of the first text line to accommodate a first word starting the second text line;
   generating, based on a result of the merging process, a text structure data model defining each text line as part of either a text item or a list item.

2. The method of claim 1, comprising:
   acquiring and displaying a plurality of strokes of digital ink as user input,
   wherein said recognising comprises performing the text handwriting recognition on the acquired strokes and identifying the plurality of successive text lines from the recognised text.

3. The method of claim 1, wherein said pattern detection comprises, for each text line, comparing a first symbol starting said text line with a set of predetermined list symbols to determine whether there is a match.

4. The method of claim 1, wherein the merging process comprises maintaining as separate items each pair of consecutive text lines formed by a first text line followed by a second text line if the first text line is a text item and the second text line is a list item.

5. The method of claim 1, wherein the text structure data model decomposes the recognised text into at least one text item and/or at least one list item, each item being associated with at least one text line and with each stroke belonging to said at least one text line.

6. The method of claim 1, comprising an editing of the recognised text based on the text structure data model, in response to user instructions, said editing comprises at least one of:
   modifying the content of at least one item of the recognised text; and
   a reflow process causing reflow of the digital ink of at least one item of the recognised text wherein the computing device uses information of the text structure data model to control said editing.

7. The method of claim 1, comprising:
   displaying the recognised text;
   after said generating the text structure data model, acquiring user instructions causing alterations to the recognised text being displayed; and
   an update process wherein the text structure data model is updated to reflect the alterations caused by the user instructions.

8. The method of claim 7, wherein the alterations caused by the user instructions comprise adding at least one new stroke into the electronic document and/or removing or modifying at least one existing stroke,
   wherein the update process comprises updating the text structure data model by deleting any removed stroke from the text structure data model and by allocating any new stroke to an existing or new item, either text or list item, of the text structure data model.

9. The method of claim 7, wherein said generating the text structure data model comprises defining:
   for each text item, a begin zone which starts at the first visible character in said text item and extends forwards to enclose one or more complete words until a predefined number of consecutive visible characters is reached or less if said beginning zone reaches the end of said text item; and
   for each list item, a bullet zone which starts at the associated predefined list symbol and extends forwards to enclose one or more complete words until a predefined number of consecutive visible characters is reached or less if said bullet zone reaches the end of said list item;
   wherein the update process comprises:
   determining for each item whether the alterations caused by the user instructions modify its begin zone or bullet zone and/or whether at least one character is added before said begin zone or bullet zone and, in the affirmative, updating said begin zone or bullet zone based on the alterations and repeating said steps a), b) and c) based on said updated begin zone or bullet zone to update the text structure data model.

10. The method of claim 7, wherein the update process comprises:
    detecting at least one stroke added within a text line of a text or list item in response to said user instructions;
    determining whether said text line starts by a predetermined list symbol indicating that said text line is part of a list; and
    in the affirmative, splitting the corresponding text item or list item to create a new list item and updating the text structure data model to reflect said splitting.

11. The method of claim 7, wherein said generating the text structure data model comprises defining:
    for each text item and each list item, a respective begin zone which starts at the first visible character in each text line of said item past its first line and extends forwards to enclose one or more complete words until a predefined number of consecutive visible characters is reached or less if said begin zone reaches the end of said text line; and wherein the update process comprises:

checking, for each text item and each list item, each text line past its first text line for any new stroke added within the begin zone or before the begin zone of said text line in response to said user instructions;

for each positively checked text line, determining whether said text line starts by a predetermined list symbol indicating that said text line is part of a list; and in the affirmative, splitting the corresponding text item or list item to create a new list item starting with the predetermined list symbol and updating the text structure data model to reflect said splitting.

12. The method of claim 7, wherein said generating the text structure data model comprises defining, for each text and list item, an end zone which extends backwards from the last visible character of said item by enclosing one or more completes words until a predefined number of consecutive visible characters is reached or less if said end zone reaches the beginning of said item;

wherein the update process comprises:

determining for each item whether the alterations caused by the user instructions modify its end zone and/or whether at least one stroke is added after the end zone and, in the affirmative, updating said end zone based on the alterations and repeating said step c) based on said updated end zone to update the text structure data model.

13. The method of claim 7, wherein in response to a split command received as user instructions for splitting an existing item into two distinct items:

if the split command specifies a splitting location at the start or end of a text line, an empty line is inserted at said splitting location; and if the split command specifies a splitting location within a text line, the update process comprises:

splitting said text line at the splitting location into a first text line and a second text line belonging respectively to a first item and a second item obtained from splitting said existing item;

determining whether the second text line starts by a predetermined list symbol indicating that said second text line is part of a list; and in the affirmative, classifying the second item as a list item, otherwise classifying the second item as a text item.

14. The method of claim 1, wherein two consecutive items are merged into a same item only in response to a user instruction to join two distinct items together.

15. A computing device for processing lists in handwriting, comprising:

a recognition module configured to recognise text by performing text handwriting recognition on a plurality of strokes of digital ink in an electronic document, said text comprising a plurality of successive text lines which can each be either a list item which is part of a list or a text item which is not part of a list;

a classifier module configured to initially classify each recognised text line as a distinct text item and to perform a classification process comprising the following steps:

a) pattern detection in each text line for determining whether said text line starts by a predetermined list symbol indicating that said text line is part of a list, and classifying each text line starting with a predetermined list symbol as a list item;

b) in response to step a), determining an item indentation of each text item with respect to a reference position and determining for each list item a text indentation representing the indentation of text comprised in said list item with respect to the reference position;

c) in response to step b), a merging process comprising:

merging, as part of a same text item, each pair of consecutive text lines, in said text, formed by a first text line followed by a second text line if the first and second text lines of said pair are text items with a same item indentation and if there is not enough free space in the end of the first text line to accommodate a first word starting the second text line; and merging, as part of a same list item, each pair of consecutive text lines formed by a first text line followed by a second text line if the first text line is a list item and the second text line is a text item with an item indentation matching the text indentation of the first text line and if there is not enough free space in the end of the first text line to accommodate a first word starting the second text line;

a model management module configured to generate, based on a result of the merging process, a text structure data model defining each text line as part of either a text item or a list item.

\* \* \* \* \*